(12) United States Patent
Hirotsu et al.

(10) Patent No.: US 8,578,135 B2
(45) Date of Patent: Nov. 5, 2013

(54) APPARATUS FOR CALCULATING AND PREFETCHING A BRANCH TARGET ADDRESS

(75) Inventors: Teppei Hirotsu, Hitachi (JP); Yuuichi Abe, Mito (JP); Takeshi Kataoka, Tokyo (JP); Yasuhiro Nakatsuka, Naka (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/423,145

(22) Filed: Mar. 16, 2012

(65) Prior Publication Data

US 2012/0173850 A1 Jul. 5, 2012

Related U.S. Application Data

(63) Continuation of application No. 11/046,453, filed on Jan. 28, 2005, now abandoned.

(30) Foreign Application Priority Data

Jan. 29, 2004 (JP) .................................. 2004-021207

(51) Int. Cl.
*G06F 9/30* (2006.01)
*G06F 9/40* (2006.01)
*G06F 15/00* (2006.01)

(52) U.S. Cl.
USPC .......................................... 712/207; 712/239

(58) Field of Classification Search
None
See application file for complete search history.

(56) References Cited

U.S. PATENT DOCUMENTS

| | | |
|---|---|---|
| 4,709,324 A | 11/1987 | Kloker |
| 4,714,994 A | 12/1987 | Oklobdzija et al. |
| 6,108,773 A * | 8/2000 | Col et al. ...................... 712/237 |
| 6,341,335 B1 | 1/2002 | Kanai et al. |
| 6,910,124 B1 | 6/2005 | Sinharoy |
| 7,134,004 B1 | 11/2006 | Tago et al. |

FOREIGN PATENT DOCUMENTS

| | | |
|---|---|---|
| JP | 51-46038 A | 4/1976 |
| JP | 06-274341 A | 9/1994 |
| JP | 08-221270 A | 8/1996 |
| JP | 09-091139 A | 4/1997 |
| JP | 11-232171 A | 8/1999 |

OTHER PUBLICATIONS

Nunomura et al.; M32R/D—Integrating DRAM and Microprocessor; 1997; IEEE.*

(Continued)

*Primary Examiner* — Corey S Faherty
(74) *Attorney, Agent, or Firm* — Kilpatrick Townsend & Stockton LLP

(57) ABSTRACT

A high-performance information processing technique permitting updating of an instruction buffer ready for effective prefetching to branch instructions and returning to the subroutine with a small volume of hardware is to be provided at low cost. It is an information processing apparatus equipped with a CPU, a memory, prefetch means and the like, wherein a prefetch address generator unit in the prefetch means decodes a branching series of instructions including at least one branched address calculating instruction and branching instruction to a branched address out of a current instruction buffer storing the series of instructions currently accessed by the CPU, and thereby looks ahead to the branching destination address. The information processing apparatus further comprises a RTS instruction buffer for storing a series of instructions of the return destinations of RTS instructions, and series of instructions stored in the current instruction buffer are saved into the RTS instruction buffer.

4 Claims, 19 Drawing Sheets

(56) References Cited

OTHER PUBLICATIONS

Japan Patent Office office action for patent application JP2008-299692 (Feb. 21, 2012).

Rotenberg et al. "A Low Latency Approach to High Bandwidth Instruction Fetching," Proceedings of the 29th IEEE/ACM International Symposium on Microarchitecture (MICRO-29), pp. 24-34 (Dec. 1996).

* cited by examiner

| ENTRY | BIT | | | | | | | |
|---|---|---|---|---|---|---|---|---|
| | 127~112 | 111~96 | 95~80 | 79~64 | 63~48 | 47~32 | 31~16 | 15~0 |
| 0 | 0 | 2 | 4 | 6 | 8 | 10 | 12 | 14 |
| 1 | 16 | 18 | 20 | 22 | 24 | 26 | 28 | 30 |
| 2 | 32 | 34 | 36 | 38 | 40 | 42 | 44 | 46 |
| .. | .. | .. | .. | .. | .. | .. | .. | .. |
| 8 | 128 | 130 | 132 | 134 | 136 | 138 | 140 | 142 |
| .. | .. | .. | .. | .. | .. | .. | .. | .. |
| 32 | 512 | 514 | 516 | 518 | 520 | 522 | 524 | 526 |
| .. | .. | .. | .. | .. | .. | .. | .. | .. |
| 50 | 800 | 802 | 804 | 806 | 808 | 810 | 812 | 814 |
| .. | .. | .. | .. | .. | .. | .. | .. | .. |

| STATE | OUTPUT | |
|---|---|---|
| | pfreq | pftype[1:0] |
| IDLE | 0 | 0 |
| VECF0 | 1 | 1 |
| VECF1 | 0 | 0 |
| JMP0 | 0 | 0 |
| JMP1 | 1 | 2 |
| RTN | 1 | 3 |

FIG. 15

| No | INSTRUCTION | INSTRUCTION CODE | ACTION |
|---|---|---|---|
| 1 | MOVI20S #imm20, Rn | 0000nnnniiiiiiii0001iiiiiiiiiiii | imm20 << 8 → Rn |
| 2 | ADD #imm8, Rn | 0111nnnniiiiiiii | Rn + imm8 → Rn |
| 3 | JSR @Rn | 0100nnnn00001011 | PC → SPC, Rn → PC |

FIG. 17

| ENTRY | BIT | | | | | | | |
|---|---|---|---|---|---|---|---|---|
| | 127~112 | 111~96 | 95~80 | 79~64 | 63~48 | 47~32 | 31~16 | 15~0 |
| 0 | INSTRUCTION 0 | INSTRUCTION 2 | INSTRUCTION 4 | INSTRUCTION 6 | INSTRUCTION 8 | INSTRUCTION 10 | INSTRUCTION 12 | INSTRUCTION 14 |
| .. | .. | .. | .. | .. | .. | .. | .. | .. |
| 8 | MOVI20S #10, R1 | | ADD #8, R1 | JSR @R1 | INSTRUCTION 136 | INSTRUCTION 138 | INSTRUCTION 140 | INSTRUCTION 142 |
| .. | .. | .. | .. | .. | .. | .. | .. | .. |
| 63 | INSTRUCTION 1008 | INSTRUCTION 1010 | INSTRUCTION 1012 | INSTRUCTION 1014 | INSTRUCTION 1016 | INSTRUCTION 1018 | INSTRUCTION 1020 | INSTRUCTION 1022 |
| .. | .. | .. | .. | .. | .. | .. | .. | .. |
| 100 | INSTRUCTION 1600 | INSTRUCTION 1602 | INSTRUCTION 1604 | INSTRUCTION 1606 | INSTRUCTION 1608 | INSTRUCTION 1610 | INSTRUCTION 1612 | RTS |

FIG. 19

| ENTRY | BIT | | | | | | | |
|---|---|---|---|---|---|---|---|---|
| | 127~112 | 111~96 | 95~80 | 79~64 | 63~48 | 47~32 | 31~16 | 15~0 |
| 0 | INSTRUCTION 0 | INSTRUCTION 1 | INSTRUCTION 2 | INSTRUCTION 3 | INSTRUCTION 4 | INSTRUCTION 5 | INSTRUCTION 6 | INSTRUCTION 7 |
| .. | .. | .. | .. | .. | .. | .. | .. | .. |
| 8 | INSTRUCTION 128 | INSTRUCTION 130 | INSTRUCTION 132 | INSTRUCTION 134 | INSTRUCTION 136 | INSTRUCTION 138 | MOVI20S #10, R1 | .. |
| 9 | ADD #8, R1 | JSR @R1 | INSTRUCTION 148 | INSTRUCTION 150 | INSTRUCTION 152 | INSTRUCTION 154 | INSTRUCTION 156 | INSTRUCTION 158 |
| .. | .. | .. | .. | .. | .. | .. | .. | .. |

APPARATUS FOR CALCULATING AND PREFETCHING A BRANCH TARGET ADDRESS

CROSS REFERENCE TO RELATED APPLICATION

This application is a continuation application under 37 CFR §1.53(b) of application Ser. No. 11/046,453, filed on Jan. 28, 2005, which claims priority from Japanese Patent Application Serial No. 2004-021207, filed on Jan. 29, 2004, the content of which is hereby incorporated by reference into this application.

FIELD OF THE INVENTION

The present invention relates to an information processing apparatus comprising a CPU, a memory and a prefetch means. It particularly relates to an interruption routine thereof and a technique prefetching a target instruction of RTE (return from exception). Further it relates to a technique effectively applicable to prefetching a target instruction for branch to a subroutine and to storing a target instruction of RTS (return from subroutine).

BACKGROUND OF THE INVENTION

Recently, while the operating frequency of CPUs has remarkably increased than before, the increase of operating frequency of memories has gently increased compared with that of CPUs to meet the requirement for greater capacities. The resultant disparity between CPUs and memories in operating frequency is bringing to a problem of no significant improvement in the overall performance of systems.

A prefetch buffer or cache readable with high speed is generally used to solve the problem as follows. Instructions to be necessary in advance are stored in the prefetch buffer or cache, and they are read from that. Accordingly, the delays in reading out of the memory are covered with the function of the prefetch buffer or cache, and devices with the memory are improved.

When the program being executed includes any branch instruction, it is necessary to execute a prefetch that properly anticipates a target (destination) instruction for branch and reads it out to a prefetch buffer or the like.

One of Methods of the prefetch is that anticipates the target address for branch on the basis of history of the execution of the branch instruction and reads the target address anticipated branching destination instruction out of the memory into the prefetch buffer. However, this involves another problem that, where processing is actually branched in accordance with a branch instruction, a configuration in which the aforementioned anticipation is done when the instruction is executed, the series of instructions after the branching cannot be prefetched in time.

In view of this problem, a technique by which the possibility of branch is anticipated at the stage of prefetching instructions and prefetching the subsequent series of instructions is disclosed in Japanese Patent Laid-Open No. H6 (1994)-274341 (hereafter "Patent Reference 1").

SUMMARY OF THE INVENTION

According to the technique disclosed in Patent Reference 1 cited above, only the target instruction for branch is prefetched, but neither a branch to an interruption routine nor to a return from an interruption (execution) routine to a main routine is.

For this reason, in an application involving many interruptions, there still remains the problem of no improvement in performance. Or in an application needing a high level of real time performance, there arises a problem that no sufficient time for interruptions can be secured.

A first object of the present invention is to provide an information processing technique permitting effective prefetching, ensuring high performance and meeting a high-level requirement for real time performance even with an application involving many interruptions.

Furthermore, according to the technique disclosed in Patent Reference 1 cited above, the accuracy of prefetcing the target instructions for branch is dependent on the capacity of a branch history table, and therefore involves a problem of a higher system price because enhancing its performance would require a high-speed and large-capacity RAM for the branch history table.

A second object of the present invention is to provide a high-performance information processing technique permitting at low cost updating of an instruction buffer ready for effective prefetching branch instructions and returning from the subroutine with a small volume of hardware.

The above-described and other objects and novel features of the present invention will become apparent from the following description in this specification when taken in conjunction with the accompanying drawings.

Typical aspects of the invention disclosed in the present application will be briefly described below.

In order to achieve the first object of the invention stated above, the invention is applied to an information processing apparatus which is provided with a CPU, a memory and a prefetch means which prefetches a series of instructions comprising a predetermined number of instructions and data before the CPU executes any of the instructions or data in the series of instructions, and is characterized as follows.

The information processing apparatus is further provided with a prefetch address calculation means which, when an interruption request arises, prefetches an interruption vector table, further extracts the head (first) address of an interruption routine out of read data in the interruption vector table prefetched, and thereby prefetches the head address of the interruption routine.

The information processing apparatus is further provided with prefetch address generating means which, at the time when the series of instructions is stored into a prefetch buffer, detects a prescribed "return from interruption as exception (RTE)" instruction or "return from subroutine (RTS)" instruction contained in the series of instructions and prefetches target instructions of RTE and RTS.

In order to achieve the second object of the invention stated above, the invention is applied to an information processing apparatus which is provided with a CPU, a memory and a prefetch means which prefetches a series of instructions including a predetermined number of instructions and data before the CPU executes any of the instructions or data in the series of instructions, and is characterized as follows.

The information processing apparatus is further provided with a prefetch address calculation means which prefetches a branch target address by decoding at least one information for calculation of branch target address and a series of instructions for branch including branch instructions, from a current instruction buffer storing the series of instructions currently accessed with the CPU.

The information processing apparatus is further provided with a prefetch address calculation means which prefetchs a branch target address by decoding at least one information for calculation of branch target address and a series of instructions for branch including branch instructions, from a current instruction buffer storing a series of instructions currently accessed with the CPU and a previous instruction buffer storing a series of instructions previously accessed with the CPU.

The information processing apparatus is further provided with at least one RTS buffer for storing a series of target instructions of RTS, and a current instruction buffer for storing a series of instructions currently accessed by the CPU. The series of instructions in the current instruction buffer are stored into the RTS buffer.

Advantages achieved by some of the most typical aspects of the invention disclosed in the present application will be briefly described below.

By prefetching interruption vectors and an interruption routine, the speed of branching into the interruption routine can be increased.

By detecting a return from interruption (RTE) instruction and prefetching the target instruction (destination) of RTE before the CPU executes the instruction, the speed of return from the interruption routine can be increased.

By detecting a return from subroutine (RTS) instruction and prefetching the target address of RTS before the CPU executes the instruction, the speed of return from the subroutine can be increased.

When the series of instructions for branch is to be decoded from the current instruction buffer and the target address for branch is to be prefetched, by decoding only series of instructions for branch satisfying specific conditions, branch instructions can be effectively prefetched with only a small volume of hardware.

Since the RTS instruction buffer for storing the series of instructions regarding the target addresses of RTS instructions is updated with a series of instructions from the current instruction buffer, it is possible to reduce performance deteriorations due to contention in memory accessing for the updating of the cache or buffers.

BRIEF DESCRIPTION OF THE DRAWINGS

FIG. 15 illustrates a branching series of instructions consisting of three instructions, No. 1 through No. 3, supposed for the information processing apparatus of Embodiment 2 of the invention.

FIG. 17 illustrates an example of program arrangement on the memory in the information processing apparatus of Embodiment 2 of the invention.

FIG. 19 illustrates an example of program arrangement in the information processing apparatus of Embodiment 2 of the invention in a case in which there is a valid series of instructions for branch spanning entry 8 and entry 9.

DESCRIPTION OF THE PREFERRED EMBODIMENTS

Preferred embodiments of the present invention will be described in detail below with reference to the accompanying drawings. In all the drawings illustrating the preferred embodiments of the invention, members having the same functions will be denoted by respectively the same signs in principle, and their description will not be repeated.

(Embodiment 1)

Embodiment 1 of the invention will be described with reference to FIG. 1 through FIG. 10.

Figure 1:
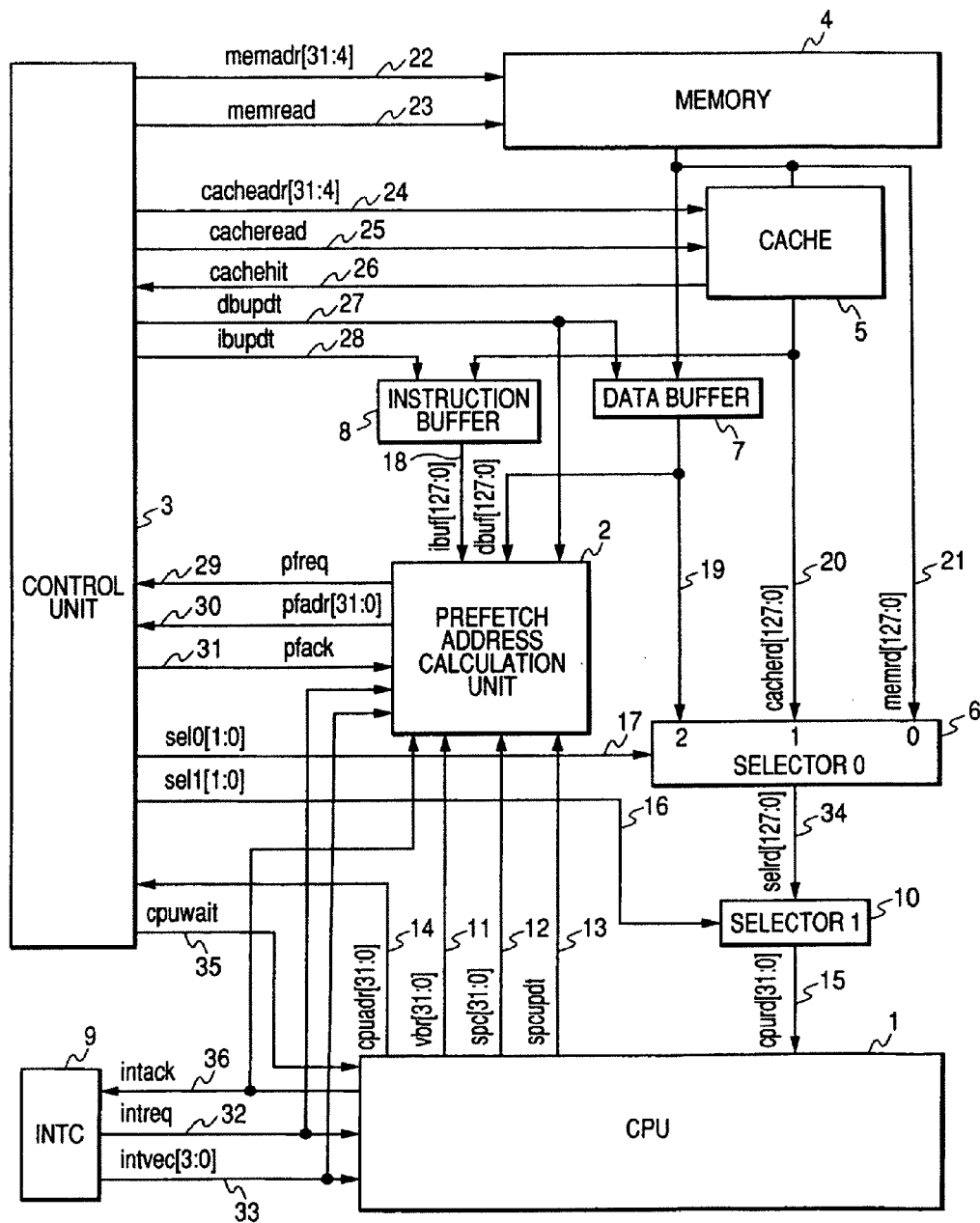
FIG. 1 shows an overall configuration of an information processing apparatus, which is Embodiment 1 of the present invention.

FIG. 1 shows an overall configuration of an information processing apparatus, which is Embodiment 1 of the present invention.

The information processing apparatus of this embodiment comprises a CPU (1), a prefetch address calculation unit (2), a control unit (3), a memory (4), a cache (5), a selector 0 (6), a data buffer (7), an instruction buffer (8), an interruption controller (hereafter "INTC") (9) and a selector 1 (10). In this configuration, the prefetch address calculation unit (2) is provided as a prefetch address calculation means. The control unit (3), the selector 0 (6), the data buffer (7), the instruction buffer (8), and the selector 1 (10), including this prefetch address unit (2), are provided to constitute a prefetch means.

The memory (4) stores programs, receives a memory address signal memadr [31:4] through a signal line 22 and a memory read signal memaread through a signal line 23, and outputs a memory read data signal memrd [127:0] through a signal line 21.

Expression memadr [31:4] here collectively refers to 28-bit signals consisting of memadr [31], memadr [30], . . . , memadr [4]. In the rest of the description of this embodiment, the same applies to other signals as well.

Incidentally in this embodiment, the access latency and the read width of the memory is supposed to be 2 and 128 bits, respectively.

The CPU (1) reads necessary instruction codes out of the memory (4) and executes programs. Though not shown, it is provided with a calculation unit and an operation control unit. The calculation unit includes an ALU(an arithmetic and logic calculation unit) for executing necessary arithmetic and logic calculation to data stored in the memory or elsewhere, a program counter, an accumulator, a general register and the like. The operation control unit generates operation control signals for the calculation unit by decoding inputted instructions.

The CPU (1) outputs through a signal line 14 a CPU address signal cpuadr [31:0] indicating an instruction code and an address of data which the CPU (1) is to access.

The CPU (1) further outputs a head address signal vbr [31:0] of a vector table through a signal line 11, a stored program counter signal spc [31:0] through a signal line 12 and a signal spcupdt indicating the valid timing of spc [31:0] through a signal line 13, to use in calculating by prefetch address calculation unit (2).

A CPU read data signal cpurd [31:0], which is a data read value of an instruction or data at an address indicated by cpuadr [31:0], is inputted to the CPU (1) from the selector 1 (10) through a signal line 15.

When cpurd [31:0] does not become definite, CPU wait signal cpuwait for stopping accessing of the CPU is inputted to the CPU (1) from the control unit (3) through a signal line 35.

An interruption request signal intreq and an interruption vector signal intvec [3:0] are also inputted to the CPU (1) from the INTC (9) through a signal line 32 and a signal line 33, respectively, and outputs an interruption accept signal intack to the INTC (9) through a signal line 36.

Incidentally in this embodiment, the instruction width of the CPU (1) is supposed to be 16 bits, and the data width and address space, to be 32 bits, respectively.

The Prefetch address calculation unit (2), when a series of instructions is stored into the instruction buffer (8), detects a RTE (return from exception(interruption)) instruction from the stored series of instructions before the RTE instruction is executed. The unit (2) calculates an address to be accessed next according to the RTE instruction, and generates a request for reading out of the memory (4) a series of instructions which includes an instruction of the address.

An interruption request signal intreq and an interruption vector signal intvec [3:0] are further inputted from the INTC (9) to the prefetch address calculation unit (2) through the signal line 32 and the signal line 33, respectively. And an interruption acknowledgement signal intack is also inputted to the unit (2) from the CPU (1) through the signal line 36. The Prefetch address calculation unit (2) calculates a target address of those signals before the CPU (1) reads an interruption vector table and an interruption routine, and it generates a request for reading out of the memory (4) a series of instructions which includes the target address.

For the aforementioned prefetch, the prefetch address calculation unit (2) outputs a prefetch address signal pfadr [31:0] indicating the address of the prefetch instruction to the control unit (3) through a signal line 30, and outputs a prefetch request signal pfreq indicating the generation of a prefetch request to the unit (3) trough a signal line 29.

The prefetch address calculation unit (2) further receives the following several signals through the respective signal lines, namely, vbr [31:0], spc [31:0] and spcupdt from the CPU (1) through their respective signal lines (11),(12) and (13), an instruction buffer output signal ibuf [127:0] from the instruction buffer (8) through a signal line 18, a data buffer output signal dbuf [127:0] from the data buffer (7) through a signal line 19, a signal pfack from the control unit (3) through a signal line 31, and a prefetch update signal dbupdt indicating the input timing of dbuf [127:0] from the control unit (3) through a signal line 27. The prefetch address calculation unit uses them for the calculation of pfadr [31:0] and pfreq.

The cache (5) stores the following instructions, namely, instructions which have been once executed or data once referenced, and instructions or data whose prefetch are requested by the prefetch address calculation unit. The Cache (5) can read with high speed any of the instructions or data stored therein.

Reading any instruction out of the cache (5) is executed by inputting from the control unit (3) a cache read address signal cacheadr [31:4] through a signal line 24 and a cache read signal cacheread through a signal line 25. When an instruction of the address indicated by cacheadr [31:4] is stored, the cashe (5) asserts a cache hit signal cachehit through a signal line 26, and outputs an instruction stored at the same time as a cache read data cacherd [127:0] through a signal line 20.

Actually, control signals for updating instructions or data stored in the cache are inputted to the cache from the control unit (3), but details are skipped in FIG. 1, and their updating are supposed to be done at the same time as reading the instructions or data out of the memory (4).

The instruction buffer (8) holds a series of instructions including an instruction currently being executed, and outputs it as an instruction buffer output signal ibuf [127:0] through signal line 18.

The instruction buffer (8) receives through a signal line 28 an instruction buffer update signal ibupdt which indicates the update timing of values held by the instruction buffer, and captures the signal of cacherd [127:0].

The data buffer (7) holds the vector table whose prefetch is requested by prefetch address calculation unit (2), and outputs it as a data buffer output signal dbuf [127:0] through a signal line 19. The data buffer (7) receives through a signal line 27 a data buffer update signal dbupdt indicating the update timing of values held by the data buffer, and captures the signal of memrd [127:0] from the memory (4).

The selector 0 (6) receives a selection signal sel0 [1:0] from the control unit (3) through a signal line 17, selects one signal out of dbuf [127:0], cacherd [127:0] and memrd [127:0], and outputs the result of selection as selrd [127:0] through a signal line 34. The value of sel0 [1:0] and the selected signal are 2:dbuf [127:0], 1:cacherd [127:0] and 0:memrd [127:0].

The selector 1 (10) receives a selection signal sel1 [1:0] from the control unit (3) through a signal line 16, selects 32 bits from selrd [127:0], and outputs the result of selection as cpurd [31:0]. The value of sel1 [3:0] and the selected signal are 0:selrd [127:96], 1:selrd [95:64], 2:selrd [63:32] and 3:selrd [31:0].

The above-described selection signals sel0 [1:0] and sel0 [1:0] for the selector 0 (6) and the selector 1 (10), respectively, select an output signal by which the control unit (3) can earliest supply instructions or data corresponding to the access from the CPU (1).

The INTC (9) outputs the interruption request signal intreq and the interruption vector signal intvec [3:0], and requests branch to an interruption routine corresponding to the interruption vector of the CPU (1).

The INTC (9) keeps on outputting intreq and intvec [3:0] until the interruption accept signal intack indicating acceptance of the interruption is inputted from the CPU (1).

The control unit (3) performs control pertaining to transfers of instructions and data between the CPU (1) and the memory (4) by inputting/outputting control signals to and from the CPU (1), the prefetch address calculation unit (2), the memory (4), the cache (5), the selector 0 (6), the data buffer (7), the instruction buffer (8) and the selector 1 (10).

More specifically, as will be described later, the control unit (3) controls processing in those sections by asserting the necessary ones of various control signals which are inputted at prescribed timings.

Next, details of the elements of the configuration will be described. Before describing the details, the actions of the CPU (1) supposed in this embodiment and the arrangement in a case in which the programs to be executed by the CPU (1) are stored in the memory will be described.

Figure 2:
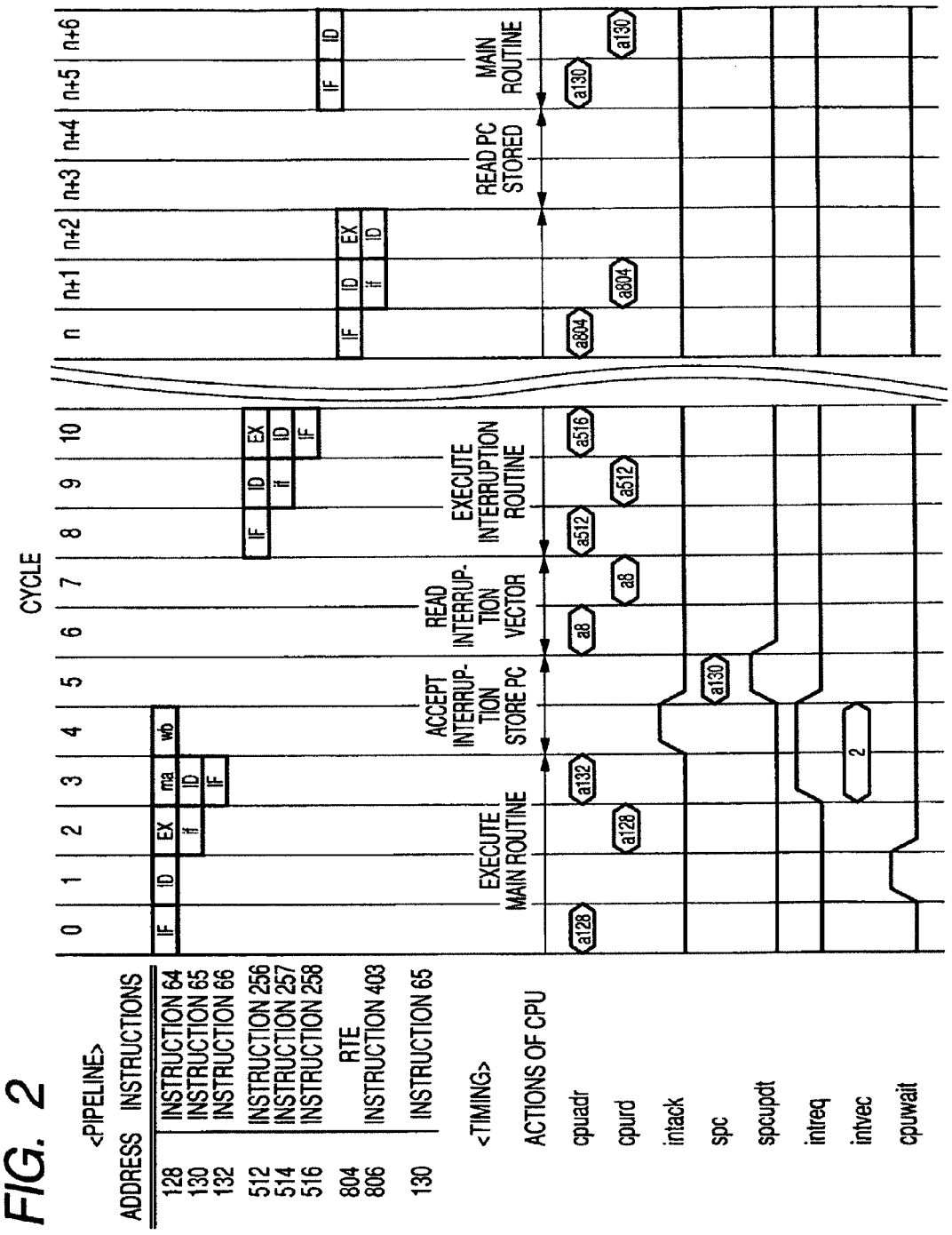
FIG. 2 is a timing chart of the actions of the CPU in the information processing apparatus of Embodiment 1 of the invention.

FIG. 2 is a timing chart of the actions of the CPU (1).

The upper part of FIG. 2 shows an example of a series of instructions to be executed by the CPU (1) and actions of the pipeline performed by the CPU (1) at the time of processing the series of instructions.

The CPU (1) processes one instruction in a five-stage pipeline comprising an instruction fetch (IF) stage of reading the instruction from the memory (4), instruction decoding (ID) stage of decoding the instruction, an execution (EX) stage of executing the instruction, a memory access (MA) stage of reading data out of the memory (4), and a write-back (WB) stage of writing into the memory (4).

Incidentally, accesses to the memory (4) occur at the IF stage, the MA stage and the WB stage of each instruction. While the IF stage, the ID stage and the EX stage are executed in every case, there are cases that the MA stage and the WB stage are not executed depending on the instruction. Further, since two 16-bit instructions are read at the same time on a bus of a 32-bit width, the IF stage is not executed in one of every two instructions. In FIG. 2, unexecuted instruction stages are written in small letters.

The lower part of FIG. 2 shows the waveforms of input/output signals of the CPU (1) generated corresponding to the pipeline actions shown in the upper part of FIG. 2.

In FIG. 2, cycle 0 is the IF stage of instruction 64 at address 128. In cycle 0, address 128 is outputted from the CPU (1) to cpuadr, and an access to an instruction in address 128 is generated.

Then for the next cycle 1, there is shown a situation in which any data to be accessed in cycle 1 is not definite on account of a delay in outputting from the memory or some other reason. At this time, the control unit (3) asserts cpuwait, and instructs the CPU (1) to suspend instruction processing.

The data is made definite in the next cycle 2 and, in response to the negation of cpuwait, the CPU (1) resumes processing. In cycle 2, an instruction at address 128 for the access in cycle 0 is inputted from cpurd to the CPU (1).

Incidentally in FIG. 2, the address output of address 128 and the instruction and data read out in response to the access are expressed as "a128".

In cycle 3, the INTC (9) outputs interruption factor (vector) 2 as the interruption request signal intreq and the interrupt factor signal intvec [3:0], requests branch to an interruption routine corresponding to the interruption vector 2 of the CPU (1).

In cycle 4, the CPU (1) informs the INTC (9) the acceptance of interruption according to the interruption vector 2 by asserting intack, and in the next cycle 5 starts processing the branch of the interruption vector 2 into the interrupt routine.

In cycle 5, The CPU (1), in order to store the target (destination) address of returning from the interruption routine in a memory element such as a built-in RAM, outputs the target address 130 as spc [31:0] and asserts a signal spcupdt indicating the effective timing of spc [31:0]. In the overall configuration diagram of FIG. 1, illustration of the connection to the memory element, such as a built-in RAM, spc [31:0] and spcupdt is omitted.

In cycle 6, the CPU (1) reads in the interruption vector table out of the memory.

The interruption vector table here is a table which stores the head addresses (interruption vectors) of the interruption routine corresponding to interruption factors, in which the addresses, beginning with an address indicated by vbr [31:0], are arranged in series from interruption vector 0 onward. In this embodiment, vbr [31:0] is set to 0, and the address of the interruption vector is in series of 0, 4, 8, . . . beginning with interruption vector 0.

In order to read the accepted interruption vector of interruption factor 2 out of the memory, address 8 is accessed.

In cycle 7, the interruption vector of interruption factor 2 is read out. In this embodiment, the interruption vector as interruption factor 2 is supposed to be equal to 512.

In cycle 8, accessing the head address 512 of the interruption routine of interruption factor (vector) 2 is started.

Cycle n is the IF stage of a return instruction RTE from the interruption (exception) routine. Through the ID and EX stages of RTE, the target address 132 of RTE instruction stored in the memory element such as a built-in RAM, is read in cycles n+3 and n+4. In FIG. 1, illustration of the signal for the CPU (1) to read the stored target address of RTE is omitted.

In cycle n+5, the instruction concerning the target address of RTE is accessed, hereafter the processing of instructions by the main routine is executed.

Figures 3, 4:
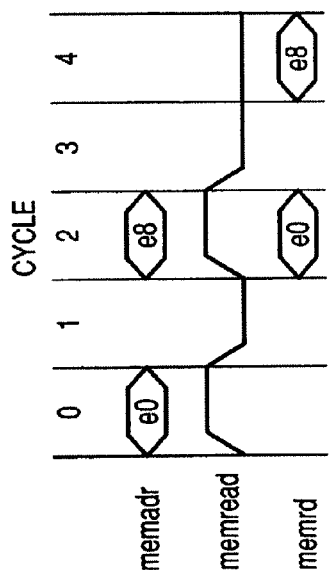
FIG. 3 illustrates the relationships among addresses, bits and entries in a case in which a program is stored into a memory in the information processing apparatus of Embodiment 1 of the invention.
FIG. 4 is a timing chart of the actions of the memory in the information processing apparatus of Embodiment 1 of the invention.

FIG. 3 illustrates the relationships among addresses, bits and entries in a case in which a program is stored into the memory (4).

As shown in FIG. 3, the instructions and data constituting the program are sequentially arranged in the ascending order of address number in the descending order of bits, with eight instructions (or data) constituting one entry. Hereinafter, instructions or data constituting one entry will be referred to as a series of instructions.

In this embodiment, the memory (4) is accessed on an entry-by-entry basis. For example, addresses 0, 2, 4, 6, 8, 10, 12 and 14 are accessed at the same time as an access to entry 0. Further, each of entry 0, entry 8, entry 32 and entry 50 shown in FIG. 3 stores the van instruction and the RTE instruction of the interruption routine corresponding to the interruption vector, the main routine and the interruption factor 2.

Where instructions or data of a 16-bit width are to be stored in such a memory (4), the bits of the address have differentiating roles as stated below.

Bits 15 through 4: For entries

Bits 3 through 1: For positions of instructions or data in the same entry Bits 0: For the upper 8 bits and lower 8 bits in instructions or data Next, the actions of the memory (4) will be described. FIG. 4 is a timing chart of the actions of the memory (4).

In cycle 0, the control unit (3) outputs entry 0 as memadr, and gives a request to read entry 0 to the memory (4) by asserting memaread. In FIG. 4, the address output of entry 0 and instructions and data read out in response to the access are expressed as "e0".

In this embodiment, since the access latency of the memory is set to two cycles, data pertaining to this access is made definite in cycle 2, and hereupon the memory (4) outputs instructions or data as memard.

Figure 5:
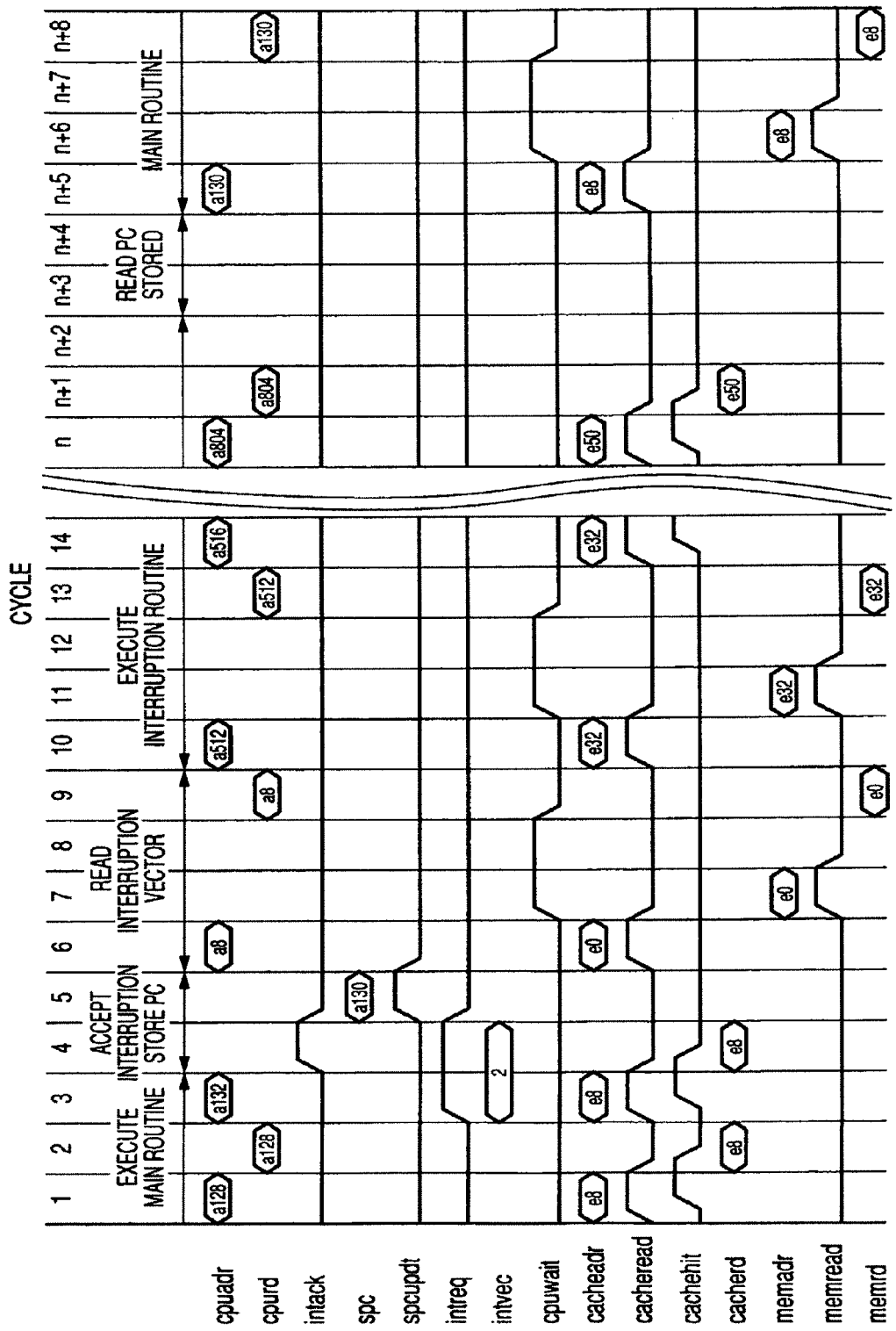
FIG. 5 is a timing chart showing a case in which a program is executed in a configuration having a memory with an access latency 2 and only consecutive instructions are prefetched in a cache in the information processing apparatus of Embodiment 1 of the invention.

A timing chart, showing a case in which a program is executed in a configuration having the memory (4) with this access latency 2 and only a series of instructions are prefetched to a cache, is given as FIG. 5.

The instructions to be executed, the timing of interruption requesting and the interruption vector are the same as those respectively described above with reference to FIG. 2.

As show in FIG. 5, cache errors occur in accessing the interruption vector (cycle 6), accessing the van instruction of the interrupt routine (cycle 10), and accessing the van instruction on the target instruction of RTE (cycle n+5), where accessing by the CPU becomes non-series, and processing by the CPU is suspended until the instructions or data to be accessed become definite, inviting a deterioration in performance.

Figure 6:
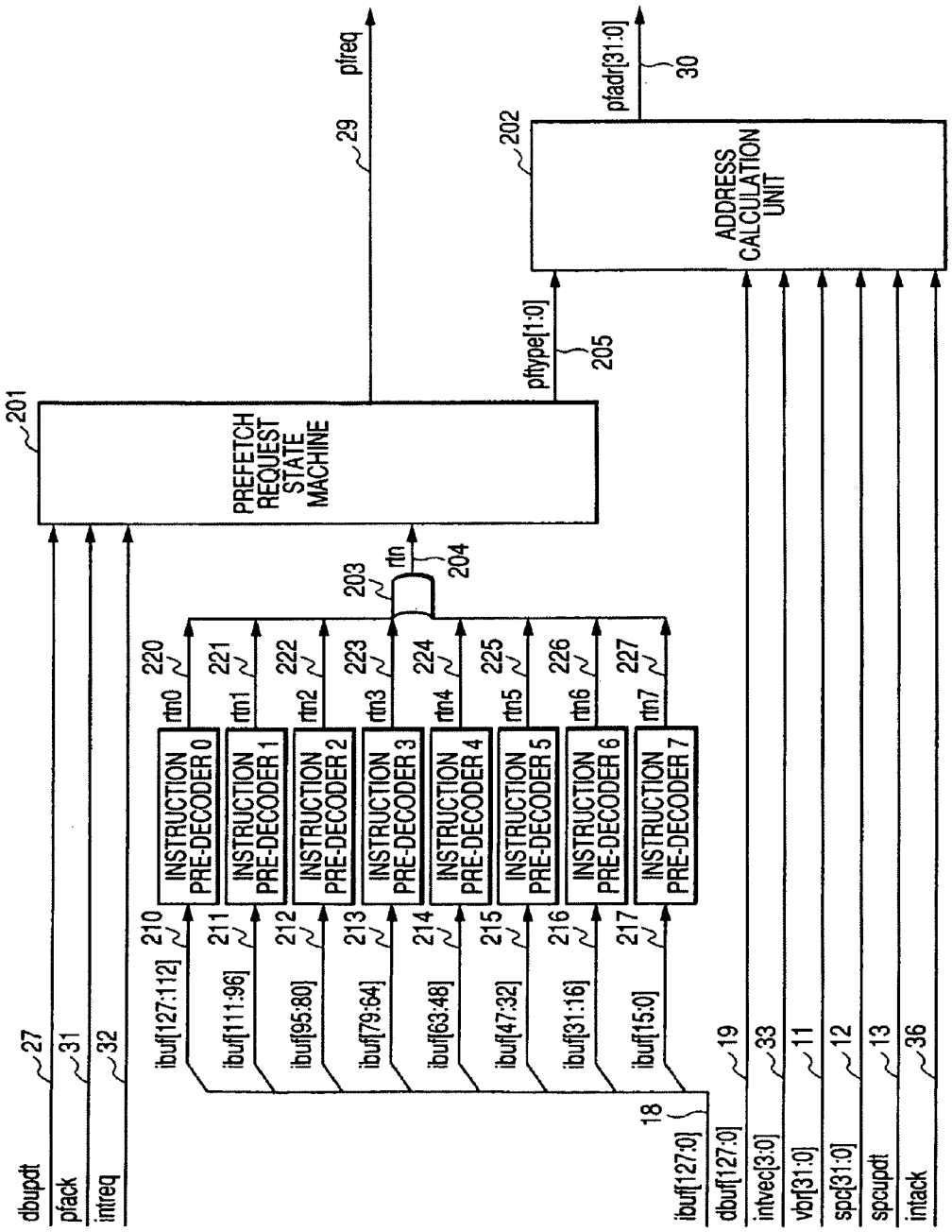
FIG. 6 shows a detailed configuration of a prefetch address calculation unit in the information processing apparatus of Embodiment 1 of the invention.

Next, details of the prefetch address calculation unit (2) will be described. FIG. 6 shows a detailed configuration of the prefetch address calculation unit (2).

The Prefetch address calculation unit (2) is provided with eight instruction type pre-decoders, including an instruction pre-decoder 0 (210), an instruction pre-decoder 1 (211), . . . , and an instruction pre-decoder 7 (217) for decoding to find out whether or not inputted instructions are RTE instructions, an OR gate (203), a prefetch request state machine (201) and an address calculation unit (202).

Each of the 16-bit segments into which ibuf [127:0] is divided, is inputted to each of the instruction pre-decoder 0 (210), the instruction pre-decoder 1 (211), . . . , and the instruction pre-decoder 7 (217).

For instance, the instruction of the head address in the series of instructions of the entry outputted by ibuf [127:0] is inputted to the instruction pre-decoder 0 (210). When the inputted instruction is an RTE instruction, the instruction pre-decoder 0 (210) asserts a signal rtn0, which indicates that the instruction decoded onto the signal line 220 is an RTE instruction.

Similarly, the instruction pre-decoder 1 (211) decodes the second instruction in the series of instructions of the entry outputted by ibuf [127:0], and outputs the result as a signal rtn1 onto a signal line 221.

The types of the third, fourth, . . . , sixth instructions or data are also decoded. Similarly, the instruction pre-decoder 7 (217) decodes the eighth instruction in the series of instructions of the entry outputted by ibuf [127:0], and outputs the result as a signal rtn7 onto a signal line 227.

The "or" of rtn0, rtn0, rtn7 is calculated by the OR gate (203), and outputted as a signal rtn onto a signal line 204. According to the above-mentioned configuration, when there is at least one RTE instruction in the series of instructions of the entry outputted by ibuf [127:0], rtn is asserted.

The rtn (204), dbupdt (27), pfack (31) and intreq (32) are inputted as conditions of state transition of the prefetch request state machine (201). Further, the prefetch request state machine (201) decodes the current state, and outputs the result as pfreq (29) and pftype (205).

States, conditions of inter-state transition and outputs corresponding to different states will be described in detail afterwards with reference to FIG. 7 and FIG. 8.

The address calculation unit (202) takes in pftype (205), dbuf [127:0] (19), intvec [8:0] (33), vbr [31:0] (11), spc [31:0] (12), spcupdt (13) and intack (36),and then calculates an address to be prefetched. The calculated address is outputted through the signal line 30 as prefetch address signal pfadr [31:0] indicating the target address of the prefetch instruction. Details of the address calculation unit (202) will be described afterwards with reference to FIG. 9.

Figures 7, 8:
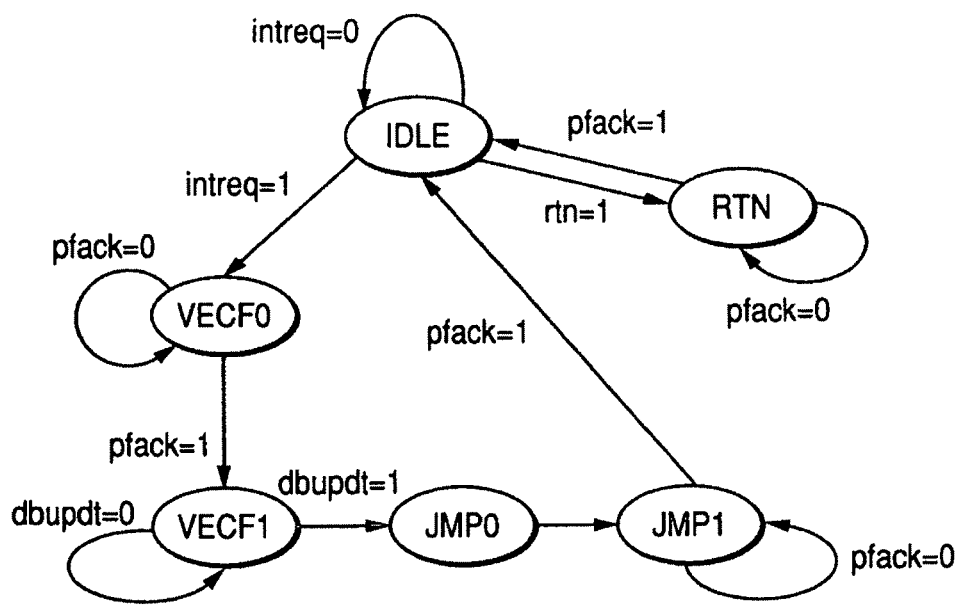
FIG. 7 illustrates the state transition of the prefetch request state machine in the information processing apparatus of Embodiment 1 of the invention.
FIG. 8 illustrates outputs pfreq and pftype matching the states shown in FIG. 7 in the information processing apparatus of Embodiment 1 of the invention.

FIG. 7 illustrates the state transition of the prefetch request state machine (201).

The prefetch request state machine (201) has six states including an IDLE state in which no request is made, a VECF0 state in which an interruption vector is prefetched, a VECF1 state, a JMP0 state in which the head address of interruption routine is prefetched, a JMP1 state and an RIN state in which a target address of return from interruption is prefetched. The initial state is the IDLE state.

The IDLE state is made transition to the same state when intreq is 0, to the VECF0 state when intreq is 1, and to the RIN state when rtn is 1, respectively.

The VECF0 state is made transition to the same state when pfack is 0 and to the VECF1 state when pfack is 1.

The VECF1 state is made transition to the same state when dbupdt is 0 and to the JMP0 state when dbupdt is 1.

The JMP0 state is made transition to the JMP1 state unconditionally.

The JMP1 state is made transition to the same state when pfack is 0 and to the IDLE state when pfack is 1.

The RIN state is made transition to the same state when pfack is 0 and to the IDLE state when pfack is 1.

FIG. 8 illustrates outputs pfreq (29) and pftype (205) corresponding to the states shown in FIG. 7. As illustrated, in the VECF0 state, the JMP1 state and the RTN state, the prefetch request pfreq is asserted to the control unit (3) and the prefetch type pftype is outputted to the address calculation unit (202). The meanings of pftype here are defined as follows:

0: No prefetch

1: Request of prefetching the interruption vector

2: Request of prefetching the van instruction of the interruption routine

Figure 9:
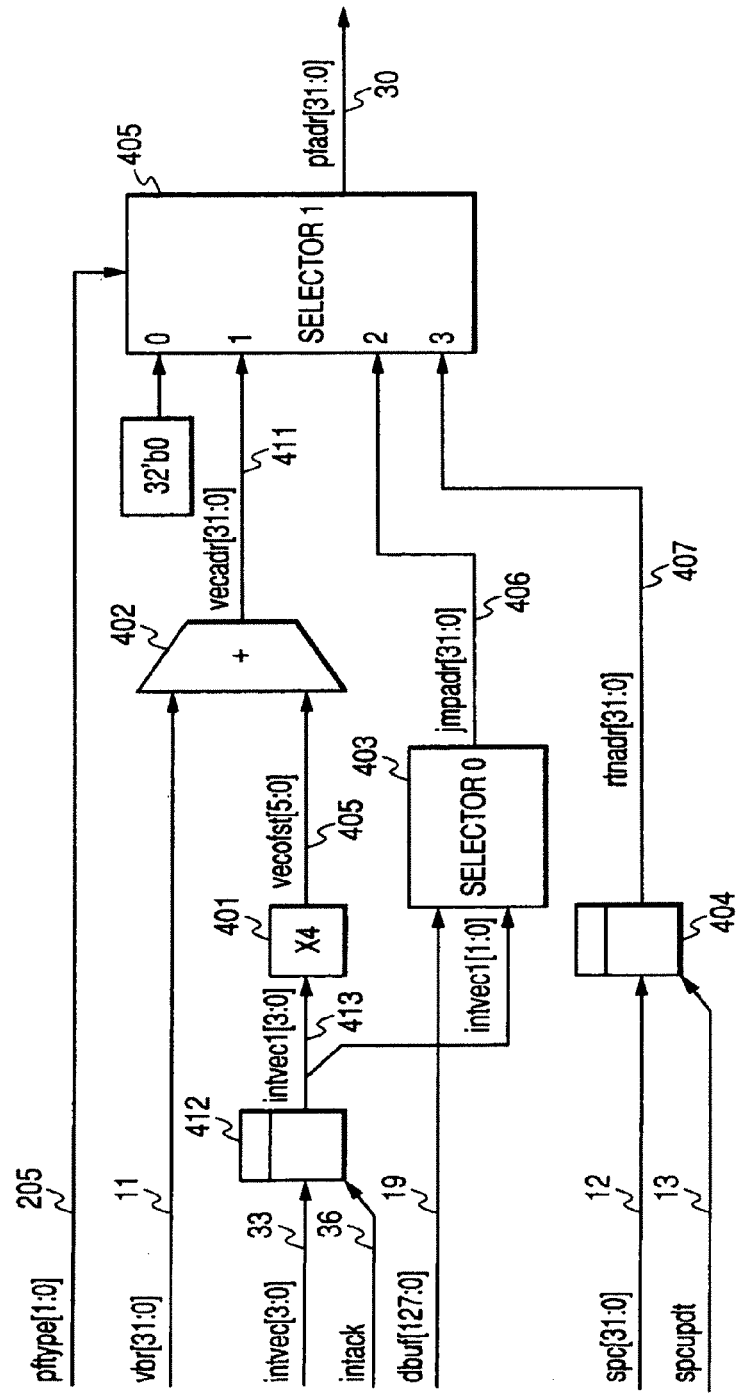
FIG. 9 shows a detailed configuration of an address calculation unit in the information processing apparatus of Embodiment 1 of the invention.

3: Request of prefetching the target address of return from the interruption (RTE) instruction FIG. 9 shows a detailed configuration of the address calculation unit (202). The address calculation unit (202) comprises an INTVEC holding register (412), a two-bit left shifter (401), an adder (402), a selector 0 (403), a stored PC holding register (404) and a selector 1 (405).

The INTVEC holding register (412) captures the value of intvec [3:0] (33) by asserting intack (36), and outputs the value it holds as a signal intvec 1 [3:0] (413) through a signal line 413.

The two-bit left shifter (401) shifts intvec 1 [3:0] (413) leftward by two bits, performs a calculation to add two lowest-order bits 0, i.e. to quadruple the input, and outputs the result as a vector offset signal vecofst [5:0] through a signal line 405.

The adder (402) adds vbr [31:0] (11) and vecofst [5:0] (405), and outputs the result as a vector address signal vecadr [31:0] through a signal line 411.

The selector 0 (403), to which two lower-order bits intvec 1 [1:0] of intvec 1 [3:0] (413) is inputted as a selection signal, selects 32 bits out of dbuf [127:0] (19), and outputs them as the head address signal of interruption routine jmpadr [31:0] through a signal line 406. The relationships between intvec 1 [3:0] and the selected bits are 0:dbuf [127:96], 1:dbuf [95:64], 2:dbuf [63:32] and 3:dbuf [31:0].

The stored PC holding register (404) captures the value of spc [31:0] (12) by asserting spcupdt (13), and outputs the held value as a target address signal of RTE rtnadr [31:0] through a signal line 407.

The selector 1 (405), to which pftype [1:0] (205) is inputted as a selection signal, selects one out of a 32-bit 0-fixed value, vecadr [31:0] (411), jmpadr [31:0] (406) and rtnadr [31:0] (407), and outputs the result as a prefetch address signal pfadr [31:0] (30). The corresponding relationships between pftype [1:0] and the selected signal are 0:fixed value, 1:vecadr [31:0], 2:jmpadr [31:0] and 3:rtnadr [31:0]. In this embodiment, although the 32-bit 0-fixed value is supposed to be selected when pftype [1:0] is 0, the choice is not limited to the 32-bit 0-fixed value, but may be any other appropriate value because no prefetch request is made.

Next, the actions of the information processing apparatus of this embodiment will be described.

Figure 10:
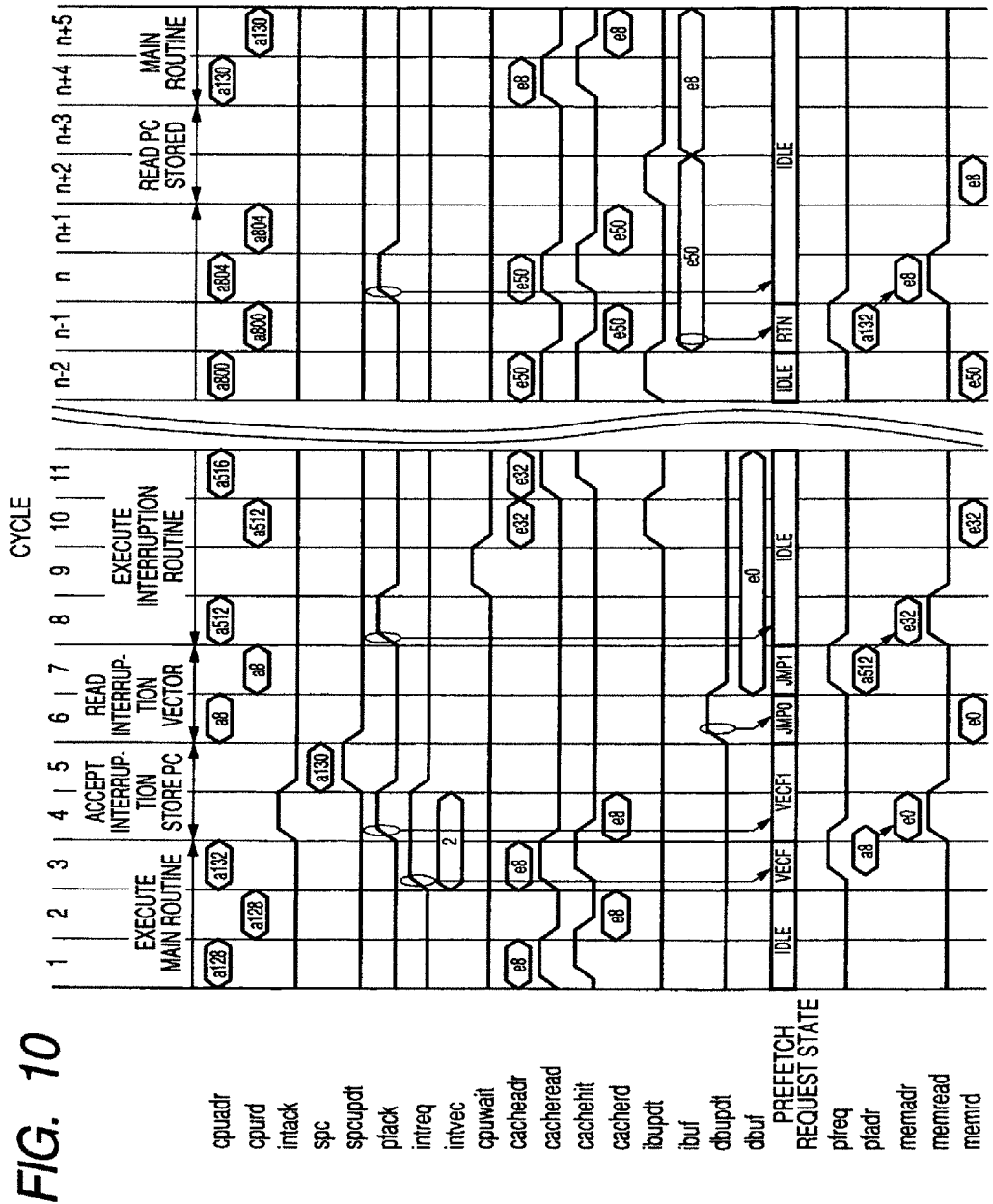
FIG. 10 is a timing chart of the actions of the information processing apparatus of Embodiment 1.

FIG. 10 is a timing chart of the actions of the information processing apparatus described so far. The instructions to be executed, the timing of interruption request and the interruption vector are the same as those respectively described above with reference to FIG. 5.

In cycle 3, the INTC (9) outputs the interruption vector 2 as the interruption request signal intreq and the interrupt factor signal intvec [8:0], and requests the CPU (1) branch into the interruption routine corresponding to the interruption vector 2. In the same cycle, the state of the prefetch request state machine (201) is made transition to the VECF0 state, and pfreq is asserted. Further, the address of the interruption vector as the interruption factor 2 is calculated by the address calculation unit (202), and address 8 is outputted as pfadr [31:0].

Then in cycle 4, the control unit (3) receives a prefetch request for address 8, outputs entry 0 as memadr, asserts memread, and makes a request to the memory (4) to read entry 0. In the same cycle, it receives pfack assert from the control unit (3), and the state of the prefetch request state machine (201) is made transition to VECF1.

In cycle 5, the CPU (1) outputs the target address 130 of RTE instruction as spc [31:0] in order to store it into a memory element such as a built-in RAM, and asserts the signal spcupdt indicating the effective timing of spc [31:0]. In the same cycle, the address calculation unit (202) holds the target address of RTE instruction in the stored PC holding register (404) for use in prefetching the target address.

Next in cycle 6, the CPU (1) accesses address 8 in order to read the interruption vector as the accepted interrupt factor 2 from the memory.

Further in the same cycle, the read data of entry 8 prefetched in cycle 4 is outputted from the memory (4) as memrd [127:0], and the control unit (3) asserts dbupdt to capture memrd [127:0] into the data buffer (7).

Further in the same cycle, in response to the assertion of dbupdt, the state of the prefetch request state machine (201) is made transition to JMP0.

Next in cycle 7, the interruption vector as the interrupt factor 2 is read out. Since the interruption vector was prefetched in advance in cycles 3 through 6, no suspension of access due to the latency of memory access occurs.

Further in the same cycle, the state of the prefetch request state machine (201) is made transition to JMP1, and pfreq is asserted. Further, the address calculation unit (202) selects the head address of the interruption routine of the interruption factor 2 out of dbuf [127:0] in which the interruption vector is stored, and outputs address 512 as pfadr [31:0].

Then in cycle 8, access to the head address of the interruption routine 512 of the interruption factor 2 is started. Further in the same cycle, the control unit (3) receives a prefetch request for the address 512, outputs entry 32 as memadr, asserts memread, and gives a request to read entry 32 to the memory (4).

Further in the same cycle, in response to assertion of pfack from the control unit (3), the state of the prefetch request state machine (201) is made transition to IDLE.

Next in cycle 10, the van instruction of the interruption routine of the interruption factor 2 is read out. Since the van instruction was prefetched in advance in cycles 7 through 10, the suspension of access due to the latency of memory access is limited to one cycle.

Although in this embodiment, the van instruction of the interruption routine of the interruption factor 2 is prefetched from cycle 7 onward, it is also possible to start prefetching in cycle 6 by configuring prefetch address calculation unit (2) so as to select the address of the van instruction of the interruption routine out of memrd [127:0] in which the interruption vector is stored. In that case, no suspension of access due to the latency of memory access occurs.

Next in cycle n−2, entry 50 is first hit, and the control unit asserts ibupdt in order to store entry 50 into the instruction buffer (8).

Then in cycle n−1, an RTE instruction is decoded from ibuf [127:0] in prefetch address calculation unit (2), the state of the prefetch request state machine (201) is made transition to RIN, and pfreq is asserted. Further, the target address of RTE held by the stored PC holding register (404) in cycle 5 is selected in the address calculation unit (202), and the address 132 is outputted as pfadr [31:0].

Next in cycle n, the control unit (3) outputs entry 8 as memadr in response to a prefetch request for the address 132, asserts memread, and gives a request to read entry 8 to the memory (4). IN the same cycle, in response to assertion of pfack from the control unit (3), the state of the prefetch request state machine (201) is made transition to IDLE.

Then in cycle n+4, the instruction of the target address of RTE is accessed and, in the following cycle n+5 the instruction of the target address is read out. Since the instruction of the target address was prefetched in advance in cycles n−1 through n+2, no suspension of access due to the latency of memory access occurs.

Although in this embodiment, prefetch address calculation unit (2) prefetches the target address of RTE by decoding the RTE instruction, the target address may as well be prefetched by decoding all the instructions branching into stored target address, including the target instruction (address) of return from a subroutine(RTS).

As hitherto described, this embodiment of the invention can provide an information processing technique permitting effective prefetch, ensuring high performance and meeting a high-level requirement for real time performance even with an application involving many interruptions.

(Embodiment 2)

Embodiment 2 of the invention will be described with reference to FIG. 11 through FIG. 21.

Figure 11:
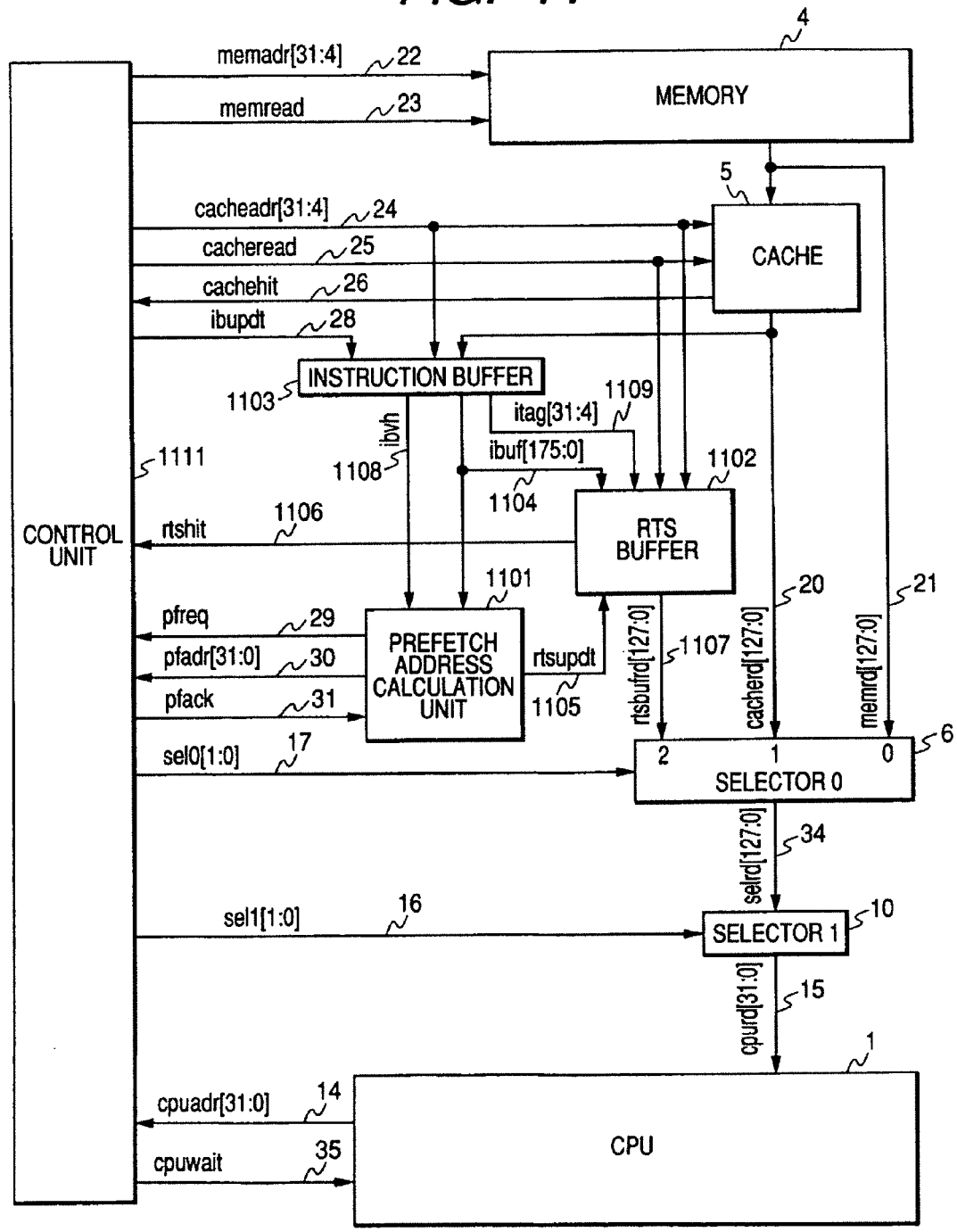
FIG. 11 shows an overall configuration of an information processing apparatus, which is Embodiment 2 of the invention.

FIG. 11 shows an overall configuration of an information processing apparatus, which is Embodiment 2 of the invention.

The information processing apparatus of this embodiment comprises a CPU (1), a memory (4), a cache (5), a selector 0 (6), a selector 1 (10), a prefetch address calculation unit (1101), a return from subroutine (RTS) instruction buffer (1102), an instruction buffer (1103) and a control unit (1111).

As the functions of the CPU (1), the memory (4), the cache (5), the selector 0 (6) and the selector 1 (10) are the same as those of their respective counterparts of Embodiment 1 described above with reference to FIG. 1, their description is omitted here.

The prefetch address calculation unit (1101), when a series of instructions are stored into the instruction buffer (1103), detects a series of instructions for branch out of the stored series of instructions, calculates the address to be accessed next in accordance with those instructions, and generates a request to read the series of instructions containing the instruction of the address out of the memory (4). An example of the series of instructions for branch will be described later with reference to FIG. 15.

For the prefetch so far described, the prefetch address calculation unit (1101) outputs to the control unit (1111) a prefetch address signal pfadr [31:0] indicating the address of the prefetch instruction on the signal line 30 and a prefetch request signal pfreq indicating the occurrence of a prefetch request on the signal line 29.

The prefetch address calculation unit (1101) further receives an instruction buffer output signal ibuf [175:0] from the instruction buffer (1103) through a signal line 1104, the upper bit valid signal ibvh of the instruction buffer through a signal line 1108, and a signal pfack from the control unit (1111) through the signal line 31, for use in the calculation of pfadr [31:0] and pfreq.

Further the prefetch address calculation unit (1101), when a series of instructions is stored into the instruction buffer (1103), detects a branch instruction for subroutine out of the stored the series of instructions and, in connection with that, asserts update a signal rtsupdt of a return from subroutine (RTS) instruction through a signal line 1105.

The instruction buffer (1103) holds the series of instructions including the instruction currently being accessed by the CPU and the series of instructions previously accessed by the CPU, and outputs them as the instruction buffer output signal ibuf [175:0] through a signal line 1104. It outputs the validity of the upper bits ibuf [175:128] of ibuf [175:0] as an instruction buffer upper bit valid signal ibvh through a signal line 1108. It further outputs the address of the series of instructions held by the instruction buffer (1103) as itag [31:4] (signal line 1109).

The instruction buffer (1103) receives through the signal line 28 an instruction buffer update signal ibufupd indicating the update timing of the series of instructions held by the instruction buffer, and captures cacheadr [31:4] and cacherd [127:0].

The RTS (return from subroutine) instruction buffer (1102) stores a plurality of series of instructions including a branch instruction for branch. It receives cacheadr [31:4] and cacheread, performs hit determination of the plurality of stored series of instructions regarding the reading of the cache (5) indicated by those signals. When a hit is determined, it will assert RTS instruction buffer hit signal rtshit through a signal line 1106, and outputs the hit series of instructions as a RTS buffer read data rtsbufrd [127:0] through a signal line 1107.

The RTS instruction buffer (1102) receives through the signal line 1105 the RTS buffer instruction update signal rtsbupdt indicating the update timing of a series of instructions held by the RTS instruction buffer, and captures itag [31:4] and ibuf [127:0].

The control unit (1111) performs control pertaining to transfers of instructions and data between the CPU (1) and the memory (4) by inputting/outputting control signals to and from the memory (4), the CPU (1), the prefetch address calculation unit (1101), the cache (5), the selector 0 (6), the selector 1 (10), the instruction buffer (1103) and the RTS instruction buffer (1102).

More specifically, as will be described later, it controls processing in those sections by asserting the necessary ones of various control signals which are inputted at prescribed timings.

Next, details of the elements of the configuration will be described.

Figure 12:
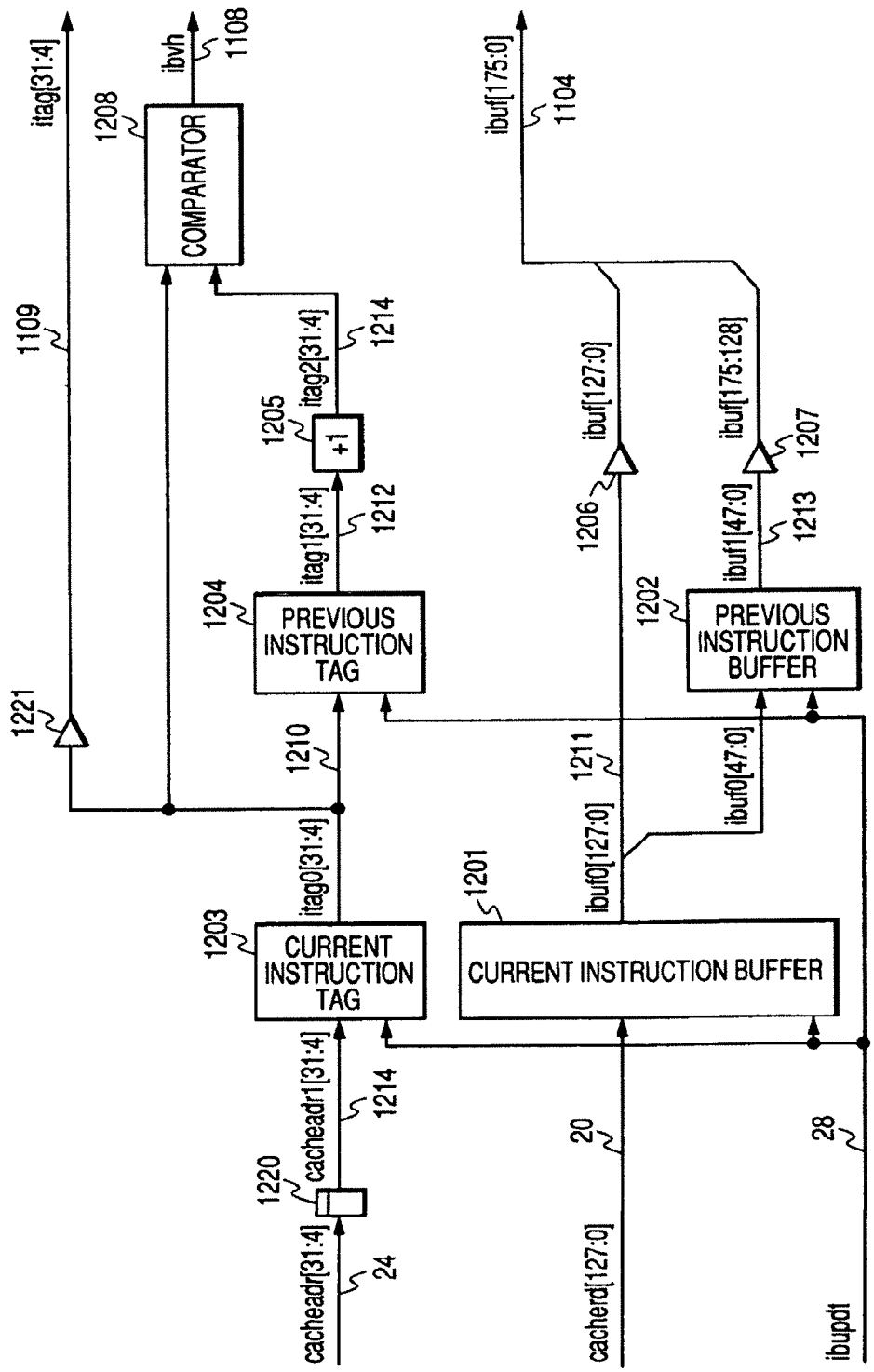
FIG. 12 shows a detailed configuration of a instruction buffer in the information processing apparatus of Embodiment 2 of the invention.

FIG. 12 shows a detailed configuration of the instruction buffer (1103).

The instruction buffer (1103) comprises a flip-flop (1220), a current instruction tag (1203), a current instruction buffer (1201), a previous instruction tag (1204), a previous instruction buffer (1202), an adder (1205), a comparator (1208), a driver (1221), a driver (1206) and a driver (1207).

The flip-flop (1220), to which cacheadr [31:4] (24) is inputted, outputs the input value as cacheadr 1 [31:4] through a signal line 1214 after one cycle.

The current instruction tag (1203) holds the address of the series of instructions stored in the current instruction buffer (1201). In response to the assertion of ibupdt (28), it captures the value of cacheadr 1 [31:4] (1214), and outputs the held value as itag 0 [31:4] through a signal line 1210.

The current instruction buffer (1201), in response to the assertion of ibupdt (28), captures the value of cacherd [127:0] (20), and outputs the held value as ibuf0 [127:0] through a signal line 1211.

The previous instruction tag (1204) holds the address of the series of instructions stored in the previous instruction buffer (1202). In response to the assertion of ibupdt (28), it captures the value of itag 0 [31:4] (1210), and outputs the held value as itag 1 [31:4] through a signal line 1212.

The previous instruction buffer (1202) captures ibuf0 [47:0] out of ibuf0 [127:0] (1211) in response to assertion of ibupdt (28), and outputs the held value as ibuf1 [47:0] through a signal line 1213.

The adder (1205) output the result of adding 1 to itag 1 [31:4] (1212) as itag 2 [31:4] through a signal line 1214.

The comparator (1208) compares itag 0 [31:4] (1210) with itag 2 [31:4] (1214) and, when they are found identical, asserts the instruction buffer upper bit valid signal ibvh through the signal line 1108. Asserting ibvh (1108) means consecutiveness of the series of instructions stored in the current instruction buffer (1201) and the series of instructions stored in the previous instruction buffer (1202).

The driver (1221) takes in itag 0 [31:4] (1210), and outputs the inputted value as itag [31:4] (signal line 1109).

The driver (1206) and the driver (1207), to which ibuf0 [127:0] (1211) and ibuf1 [47:0] (1213) are respectively inputted, output the input values respectively as ibuf [127:0] out of ibuf [175:0] (1104) and as ibuf [175:128] out of ibuf [175:0] (1104). When asserting ibvh (1108), ibuf [175:0] (1104) outputs 11 consecutive instructions.

Figure 13:
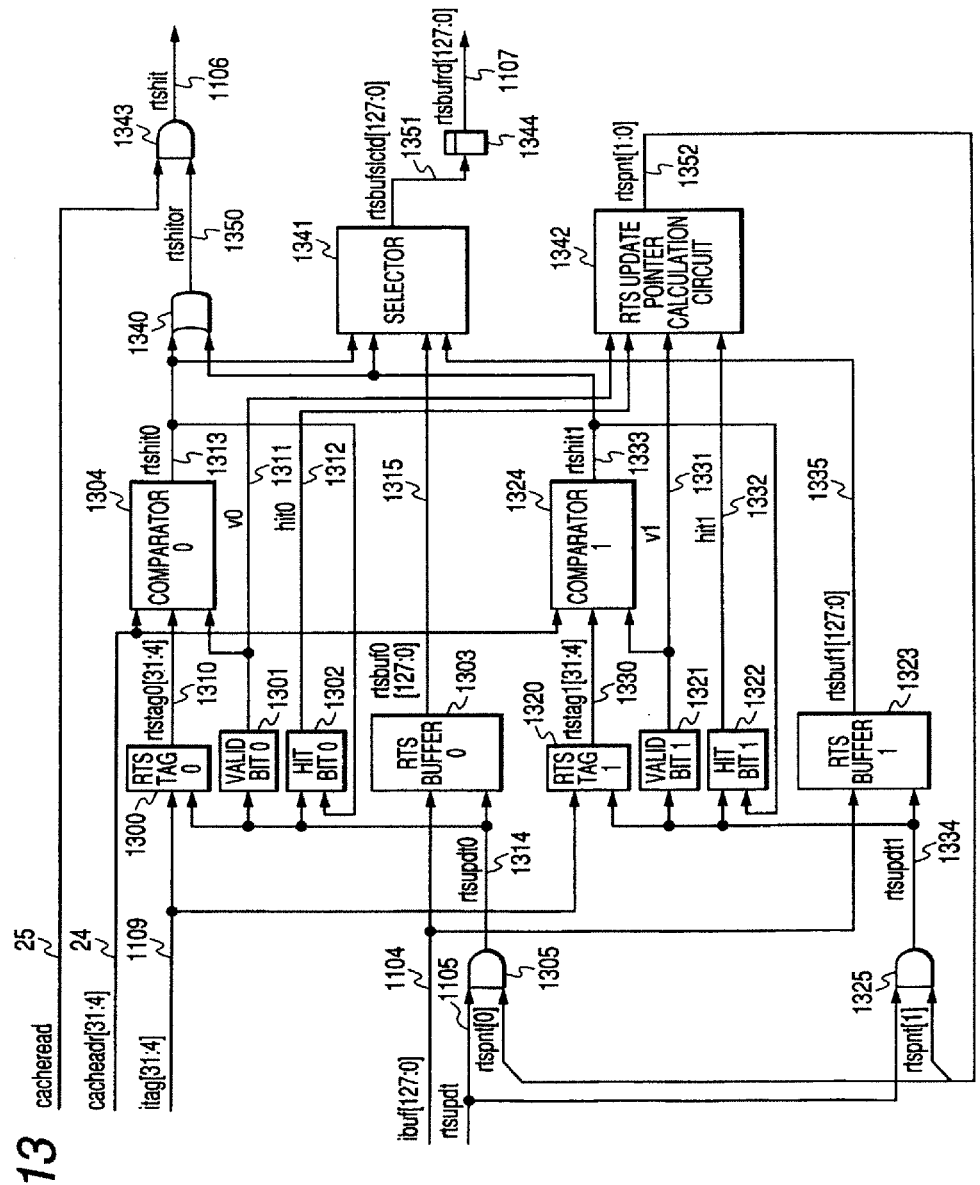
FIG. 13 shows a detailed configuration of a RTS instruction buffer in the information processing apparatus of Embodiment 2 of the invention.

FIG. 13 shows a detailed configuration of the RTS instruction buffer (1102).

The RTS instruction buffer (1102) comprises an AND gate (1305), an RTS tag 0 (1300), a validity bit 0 (1301), a hit bit 0 (1302), an RTS buffer 0 (1303), a comparator 0 (1304), an AND gate (1325), an RTS tag 1 (1320), a validity bit 1 (1321)

, a hit bit 1 (1322), an RTS buffer 1 (1323), a comparator 1 (1324), an OR gate (1340), an AND gate (1343), a selector (1341), a flip-flop (1344) and an RTS update pointer calculation circuit (1342).

In this embodiment of the invention, the RTS instruction buffer (1102) holds two entries at the maximum in the RTS buffer 0 (1303) and the RTS buffer 1 (1323).

The AND gate (1305) outputs the "and" of a RTS instruction buffer update signal rtsbupdt (1105) and rtspnt [0] as an RTS buffer 0 update signal rstupdt0 (signal line 1314). rtspnt [0] is bit 0 of an RTS update pointer signal rtspnt [1:0] (signal line 1352) indicating the RTS buffer to be updated.

The RTS tag 0 (1300) holds the addresses of series of instructions to be stored in the RTS buffer 0 (1303). It captures the value of itag [31:4] (1109) in response to the assertion of rstupdt0 (1314), and outputs the held value as rtstag0 [31:4] (signal line 1310).

The validity bit 0 (1301) stores the validity or invalidity of any series of instructions stored in the RTS buffer 0 (1303) (1: valid, 0: invalid), and outputs the stored value as v0 through a signal line 1311. The validity bit 0 (1301) has an initial value of 0, and is set to 1 in response to the assertion of rstupdt0 (1314).

The RTS buffer 0 (1303) captures the value of ibuf [127:0] (1104) in response to the assertion of rstupdt0 (1314), and outputs the held value as rtsbuf0 [127:0] through a signal line 1315.

The comparator 0 (1304), to which cacheadr [31:4] (24), rtstag0 [31:4] (1310) and v0 (1311) are inputted, asserts an RTS buffer 0 hit signal rtshit0 through a signal line 1313 when cacheadr [31:4] (24) and rtstag0 [31:4] (1310) are identical and v0 (1311) is 1. Asserting rtshit0 means that an RTS buffer 0 (1301) stores the series of instructions of the address indicated by cacheadr [31:4] (24) and the RTS buffer 0 (1303) can output the series of instructions (RTS buffer 0 hit).

The hit bit 0 (1302) stores information indicating whether or not any series of instructions stored in the RTS buffer 0 (1303) is hit (1: hit, 0: not hit), and outputs the stored value as hit0 (signal line 1312). The hit bit 0 (1302) has an initial value of 0. It is set in response to the assertion of rsthit0 (1313) and reset in response to the assertion of rstupdt0 (1314).

The AND gate (1325) outputs the "and" of the RTS instruction buffer update signal rtsbupdt (1105) and rtspnt [1] as an RTS buffer 1 update signal rstupdt1 through a signal line 1334.

The RTS tag 1 (1320) holds the addresses of series of instructions to be stored in the RTS buffer 1 (1323). In response to the assertion of rstupdt1 (1334), it captures the value of itag [31:4] (1109), and outputs the held value as rtstag1 [31:4] through a signal line 1330.

The validity bit 1 (1321) stores the validity or invalidity of any series of instructions stored in the RTS buffer 1 (1323) (1: valid, 0: invalid), and outputs the stored value as v1 through a signal line 1331. The validity bit 1 (1321) has an initial value of 0, and is set to 1 in response to the assertion of rstupdt1 (1334).

The RTS buffer 1 (1323) captures the value of ibuf [127:0] (1104) in response to the assertion of rstupdt1 (1334), and outputs the held value as rtsbuf1 [127:0] through a signal line 1335.

The comparator 1 (1324), to which cacheadr [31:4] (24), rtstag1 [31:4] (1330) and v1 (1331) are inputted, asserts an RTS buffer 1 hit signal rtshit1 through a signal line 1333 when cacheadr [31:4] (24) and rtstag1 [31:4] (1330) are identical and v1 (1331) is 1. Asserting rtshit1 means that the RTS buffer 1 (1323) stores the series of instructions of the address indicated by cacheadr [31:4] (24) and the RTS buffer 1 (1323) can output that series of instructions (RTS buffer 1 hit).

The hit bit 1 (1322) stores information indicating whether or not any series of instructions stored in the RTS buffer 1 (1323) is hit (1: hit, 0: not hit), and outputs the stored value as hit1 (signal line 1332). The hit bit 1 (1332) has an initial value of 0. It is set in response to the assertion of rsthit1 (1333) and reset in response to the assertion of rstupdt1 (1334).

The OR gate (1340) outputs the "or" of rtshit0 (1313) and rtshit1 (1333) as rtshitor (signal line 1350).

The AND gate (1343) outputs the "and" of rtshitor (1351) and cacheread (25) as the RTS instruction buffer hit signal rtshit through a signal line 1106.

Assertion of rtshit (1106) means that read data can be taken out of the RTS buffer 0 (1303) or the RTS buffer 1 (1323) in compliance with a request for reading the cache indicated by the assertion of cacheread (25) out of the entry of cacheadr [31:4] (24).

The selector (1341), to which rtshit0 (1313) and rtshit1 (1333) are inputted as selection signals, selects one out of rtsbuf0 [127:0] (1315) and rtsbuf1 [127:0] (1335), and outputs the selected one as rtsbufslctd through a signal line 1351. The relationships between the value of rtshit0 (1313) or rtshit1 (1333) and the selected signal are:

$$\{rtshit0, rtshit1\}=10:rtsbuf0\ [127:0]$$

$$\{rtshit0, rtshit1\}=01:rtsbuf1\ [127:0]$$

Thus, the selector (1341) selects the output of the hit RTS buffer out of the RTS buffer 0 and the RTS buffer 1.

The flip-flop (1344), to which rtsbufslctd (1351) is inputted, outputs one cycle afterwards the input value as RTS instruction buffer read data rtsbufrd [127:0] through a signal line 1107.

The RTS update pointer calculation circuit (1342), to which hit1 (1332), hit0 (1312), v1 (1331) and v0 (1311) are inputted, provides its output as the RTS update pointer signal rtspnt [1:0] indicating the RTS buffer to be updated through a signal line 1352.

Meanings corresponding to the value of the RTS update pointer signal rtspnt [1:0] (1352) are as follows.

01: Update the RTS buffer 0
10: Update the RTS buffer 1

The relationships between the inputs hit1 (1332), hit0 (1312), v1 (1331) and v0 (1311) of the RTS update pointer calculation circuit (1342) and its output rtspnt [1:0] (1352) are as follows.

$$\{hit1, hit0, v1, v0\}=1???\rightarrow rtspnt\ [1:0]=10$$

$$\{hit1, hit0, v1, v0\}=01??\rightarrow rtspnt\ [1:0]=01$$

$$\{hit1, hit0, v1, v0\}=000?\rightarrow rtspnt\ [1:0]=10$$

$$\{hit1, hit0, v1, v0\}=0000\ rtspnt\ [1:0]=01$$

Default→rtspnt [1:0]=00.

"?" means "don't care". Thus, the buffer to be updated is selected in an algorithm in which hit buffers are searched first and, in the absence of any hit buffer, then invalid buffers are searched.

Before describing prefetch address calculation unit (1101) in detail with reference to FIG. 14, the series of instructions for branch to be decoded by prefetch address calculation unit (1101) will be described with reference to FIG. 15.

FIG. 15 illustrates a series of instructions for branch consisting of three instructions such as No. 1 through No. 3, supposed for this embodiment of the invention. Since instruction No. 1 is a 32-bit instruction, it is equivalent to four 16-bit instructions.

The instruction coded "MOVIS20 #imm20, Rn" listed as No. 1 is an instruction to shift a 20-bit immediate value (bits 23 through 16 and 11 through 0 in the instruction code) by eight bits and store the shifted value into a register Rn. n in Rn is the register number, represented by bits 26 through 23 in the instruction code. The number of registers to be equipped by the CPU supposed for this embodiment is 16, and the register numbers n ranges from 0 to 15.

The instruction coded "ADD #imm8, Rn" listed as No. 2 is an instruction to add the immediate value of eight bits (bits 7 through 0 in the instruction code) and values to be stored in the register Rn and store the results in Rn.

The instruction coded "JSR @Rn" listed as No. 3 is an branch instruction to a subroutine, and the target address for branch is a value stored in the register Rn.

Where a series of instructions is found matching the order of instructions No. 1 through No. 3 and identical in the register number of each instruction, a subroutine branch to any desired address in a 28-bit range is executed. A series of instructions for branch satisfying these conditions is defined as a "valid series of instructions for branch".

Figure 14:
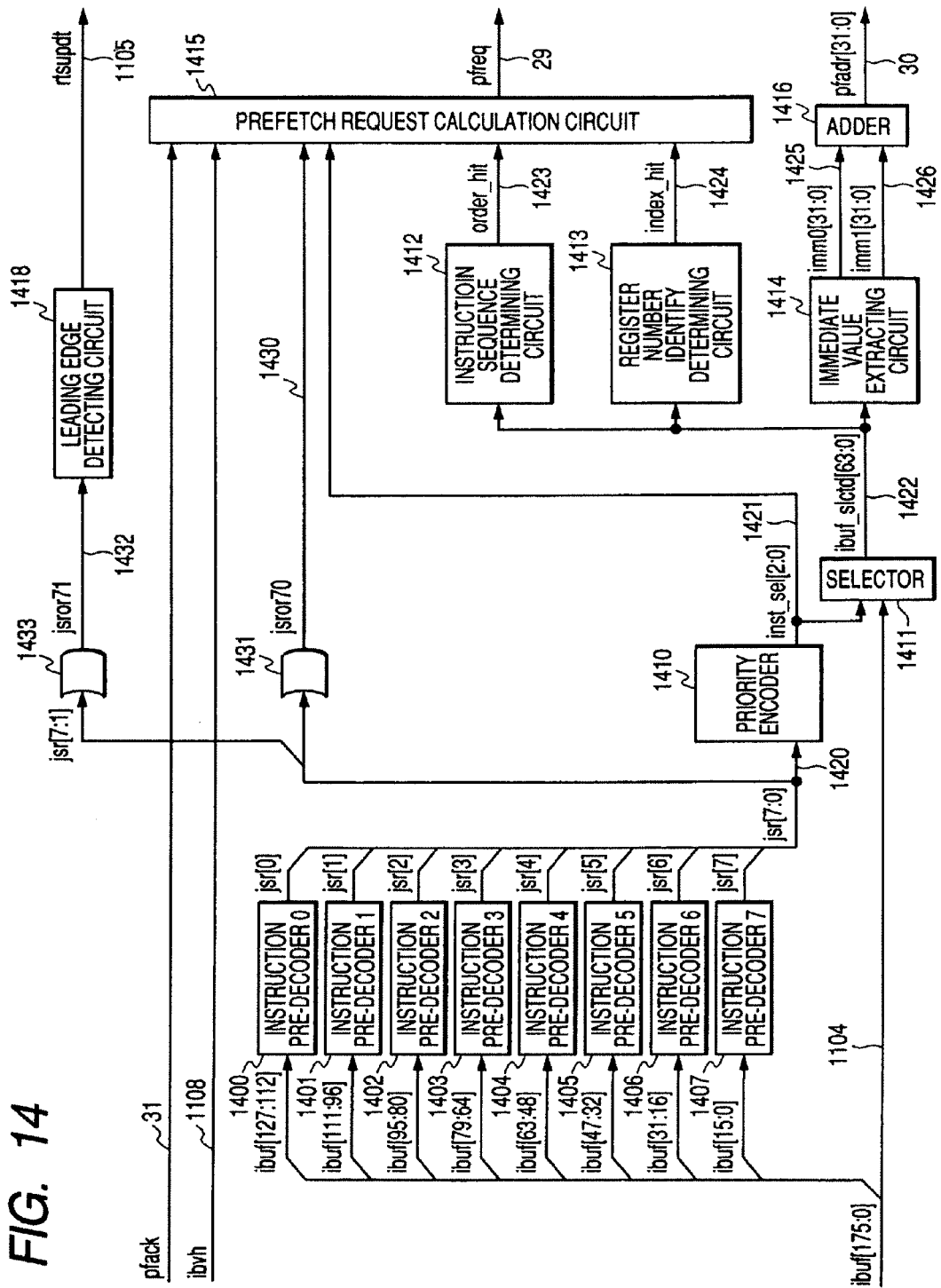
FIG. 14 shows a detailed configuration of a prefetch address calculation unit in the information processing apparatus of Embodiment 2 of the invention.

FIG. 14 shows a detailed configuration of the prefetch address calculation unit (1101).

The prefetch address calculation unit (1101) comprises an instruction pre-decoder 0 (1400), an instruction pre-decoder 1 (1401), . . . , an instruction pre-decoder 7 (1407), an OR gate (1431), a priority encoder (1410), a selector (1411), an instructions sequence circuit (1412), a register number identity determining circuit (1413), a prefetch request calculation circuit (1415), an immediate value extracting circuit (1414), an adder (1416), an OR gate (1433) and a leading edge detecting circuit (1418).

Each of the 16-bit segments into which ibuf [127:0] is divided, is inputted to each of the instruction pre-decoder 0 (1400), the instruction pre-decoder 1 (1401), . . . , the instruction pre-decoder 7 (1407).

The instruction of the head address in the series of instructions of the entry outputted by ibuf [127:0] is inputted to the instruction pre-decoder 0 (1400). When the inputted instruction is a JSR instruction, the instruction pre-decoder 0 (1400) asserts jsr [0] out of jsr [7:0] through a signal line 1420.

Similarly, the instruction pre-decoder 1 (1401) decodes the second instruction in the series of instructions of the entry outputted by ibuf [127:0], and outputs the result as jsr [1].

The types of the third, fourth, . . . , sixth instructions or data are also decoded.

Similarly, the instruction pre-decoder 7 (1407) decodes the eighth instruction in the series of instructions of the entry outputted by ibuf [127:0], and outputs the result as jsr [7].

The OR gate (1431) calculates the "or" of the bits of jsr [7:0], and outputs the result as jsror 70 through a signal line 1430. The configuration hitherto described causes, when there is at least one JSR instruction in the series of instructions of the entry outputted by ibuf [127:0], jsror 70 to be asserted.

The OR gate (1433) calculates the "or" of the bits of jsr [7:1], and outputs the result as jsror 71 through a signal line 1432.

The leading edge detecting circuit (1418) detects the leading edge of jsror 71 (1432), and asserts during one cycle the RTS buffer update signal rtsbupdt (1105) at the same timing as the detection of the leading edge.

In the configuration described above, when there is at least one JSR instruction in the seventh instructions from the van of the series of instructions in the entry outputted by ibuf [127:

0], the RTS buffer update signal rtsbupdt (1105) will be asserted to store the series of instructions containing the target address of RTS instruction into the RTS instruction buffer to prepare for a return from the subroutine. When the final instruction of the series of instructions in the entry outputted by ibuf [127:0] is a JSR instruction, since that series of instructions contains no target instruction of RTS, storing in preparation for return will be meaningless. For this reason, when there is any JSR instruction among the seventh instructions from the head of the series of instructions in the entry outputted by ibuf [127:0], rtsbupdt (1105) will be asserted.

The priority encoder (1410) outputs the result of encoding jsr [7:0] (1420) as inst_sel [2:0] through a signal line 1421. The relationships between the inputs and outputs of the priority encoder (1410) are as follows.

10000000→000

?1000000→001

??100000→010

???10000→011

????1000→100

?????100→101

??????10→110

???????1→111

Default 000

"?" means "don't care".

The selector (1411), to which inst_sel [2:0] (1421) is inputted as the selection signal, outputs the result of selecting 64 bits out of ibuf [175:0] as ibuf_slctd [63:0] through a signal line 1422. The relationships between the values of inst_sel [2:0] (1421) and the bits of selected ibuf [175:0] are as follows.

inst_sel [2:0]=000: ibuf [63:0]

inst_sel [2:0]=001: ibuf [79:16]

inst_sel [2:0]=010: ibuf [95:32]

inst_sel [2:0]=011: ibuf [111:48]

inst_sel [2:0]=100: ibuf [127:64]

inst_sel [2:0]=101: ibuf [143:80]

inst_sel [2:0]=110: ibuf [159:96]

inst_sel [2:0]=111: ibuf [175:112]

In the above-described configuration comprising the instruction pre-decoder 0 (1400), the instruction pre-decoder 1 (1401), . . . , the instruction pre-decoder 7 (1407), the priority encoder (1410) and the selector (1411), four consecutive instructions ending with a JSR instruction are selected out of the series of instructions stored in ibuf [175:0], and outputted as ibuf slctd [63:0] (1422). Further, in the presence of a plurality of JSR instructions in ibuf [175:0], four consecutive instructions including a JSR instruction nearer the top are selected.

The instruction sequence determining circuit (1412) checks whether or not the series of instructions outputted as ibuf slctd [63:0] (1422) is in the order of instructions in the series of instructions for branch described with reference to FIG. 15 and, when it does, asserts order hit through a signal line 1423.

The register number identity determining circuit (1413), supposing the order of instructions in the series of instructions for branch described with reference to FIG. 15 from the series of instructions outputted as ibuf slctd [63:0] (1422), extracts each register number of the three instructions and, when all the register numbers are found identical, asserts index_hit through a signal line 1424.

The immediate value extracting circuit (1414), supposing the order of instructions in the series of instructions for branch described with reference to FIG. 15 from the series of instructions outputted as ibuf slctd [63:0] (1422), extracts the immediate value of "MOVIS20 #imm20, Rn". Then it performs leftward shifting by eight bits and extension of the upper bit 0, and outputs the result as imm0 [31:0] through a signal line 1425. Similarly, after extracting the immediate value of "ADD #imm8, Rn", it performs extension of the upper bit 0, and outputs the result as imm1 [31:0] through a signal line 1426.

The adder (1416) adds imm0 [31:0] (1425) and imm1 [31:0] (1426), and outputs the result as the prefetch address signal pfadr [31:0] (signal line 30) indicating the address of the prefetch instruction.

The prefetch request calculation circuit (1415), to which are inputted pfack (31) indicating the acceptance of a prefetch request, the instruction buffer upper bit valid signal ibvh (1108), jsror 70 (1430), inst_sel [2:0] (1421), order_hit (1423) and index_hit (1424), asserts or negates the prefetch request signal pfreq (29). The conditions of assertion and negation of pfreq (29) are as follows.

The conditions of assertion are:

{ibvh, inst_sel [2:0], jsror 70, order_hit, index_hit}=1_111_1_1_1    (1)

{ibvh, inst_sel [2:0], jsror 70, order_hit, index_hit}=1_110_1_1_1    (2)

{ibvh, inst_sel [2:0], jsror 70, order_hit, index_hit}=1_101_1_1_1    (3)

{ibvh, inst_sel [2:0], jsror 70, order_hit, index_hit}=?_100_1_1_1    (4)

{ibvh, inst_sel [2:0], jsror 70, order_hit, index_hit}=?_011_1_1_1)    (5)

{ibvh, inst_sel [2:0], jsror 70, order_hit, index_hit}=?_010_1_1_1    (6)

{ibvh, inst sel [2:0], jsror 70, order_hit, index_hit}=?_001_1_1_1    (7)

{ibvh, inst sel [2:0], jsror 70, order hit, index hit}=?_000_1_1_1    (8)

The condition of negation is:

pfack=1

To add, "?" means "don't care". Conditions of assertion (1) through (3) are intended to restrain erroneous prefetch requests, where part of a series of instructions for branch is included in ibuf [175:127], by conditioning assertion on the inclusion of 1 in the instruction buffer upper-order bit valid signal ibvh (1108), namely the inclusion of 11 consecutive instructions in ibuf [175:0].

In the configuration described above, the prefetch address calculation unit (1101) detects a valid series of instructions for branch out of series of instructions outputted as ibuf [175:0], and outputs a prefetch request of the target address for branch to the control unit (1111).

Next, the operations of the information processing apparatus of this embodiment will be described.

Figure 16:
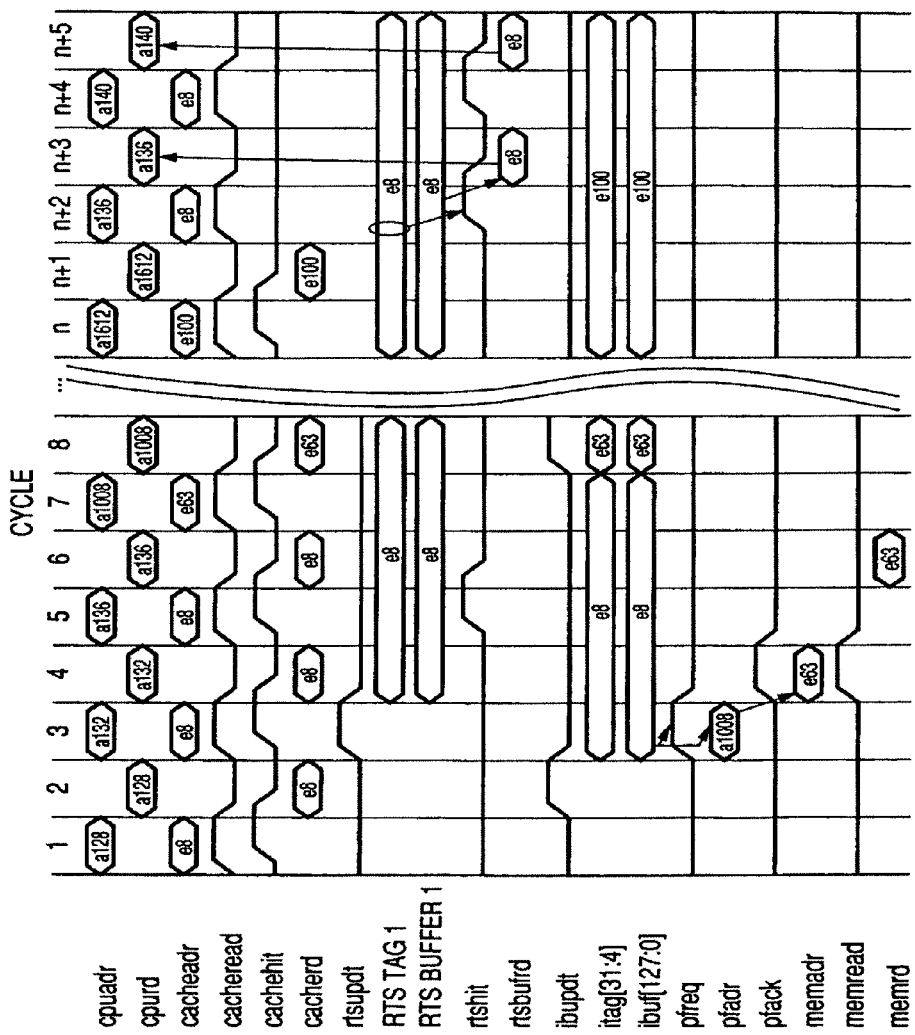
FIG. 16 is a timing chart of the actions of the information processing apparatus of Embodiment 2 of the invention.

FIG. 16 is a timing chart of the actions of the information processing apparatus of this embodiment of the invention. FIG. 17 illustrates an example of program arrangement on the memory. A valid series of instructions for branch exists in entry 8, and a return from subroutine instruction (RTS instruction) exists in entry 100. The timing chart of FIG. 16 refers to the operations of the information processing apparatus executing the program shown in FIG. 17.

In cycle 1, entry 8 is first hit, and in the following cycle 2 the control unit (1111) asserts ibufupdt to store entry 8 into the instruction buffer (1103).

Then in cycle 3, prefetch address calculation unit (1101) detects a valid series of instructions for branch existing in entry 8 from ibuf [127:0], asserts pfreq, and output a prefetch address 1008 as fpadr [31:0]. In the same cycle, it asserts an rtsbupdt signal to store the entry including the branching instruction currently being hit into the RTS instruction buffer with a view to prepare for a return from the subroutine. By storing here the entry including the branching instruction currently being hit into the RTS instruction buffer, a series of instructions can be read out of the RTS instruction buffer even when the cache is updated by the execution of a subroutine and no entry of the target address of return exists in the cache.

Next in cycle 4, the control unit (1111), by receiving a prefetch request for address 1008, outputs entry 63 as memadr, asserts memaread, and gives a request to read entry 63 to the memory (4). In the same cycle, in response to assertion of pfack from the control unit (3), pfreq is negated. Further in the same cycle, in response to rtsbupdt, entry 0 is stored into RTS tag 1 in the RTS instruction buffer, and the series of instructions of entry 0, into the RTS buffer 1.

Then in cycle 6, the read data of entry 63 prefetched in cycle 4 are outputted from the memory (4) as memrd [127:0] and, though no signal is mentioned, the control unit (1111) outputs a control signal for storing memrd [127:0] into the cache, and entry 63 is stored into the cache in the next cycle.

Next in cycle 7, though the target address (branch destination) 1008 of an instruction to branch into a subroutine existing in entry 8 is accessed, no penalty due to a cache error occurs because address 1008 was prefetched in cycle 4.

It is supposed that the program of the subroutine continues to be executed, the subroutine is registered in the cache by the time cycle n comes, and entry 8 no longer exists in the cache.

Next in cycle n+2, though an RTS instruction existing in entry 100 is executed, and address 138 is accessed, no penalty due to a cache error occurs because the entry of the target address of RTS was stored into the RTS buffer 1 in cycle 4 and the RTS buffer 1 is hit.

Figure 18:
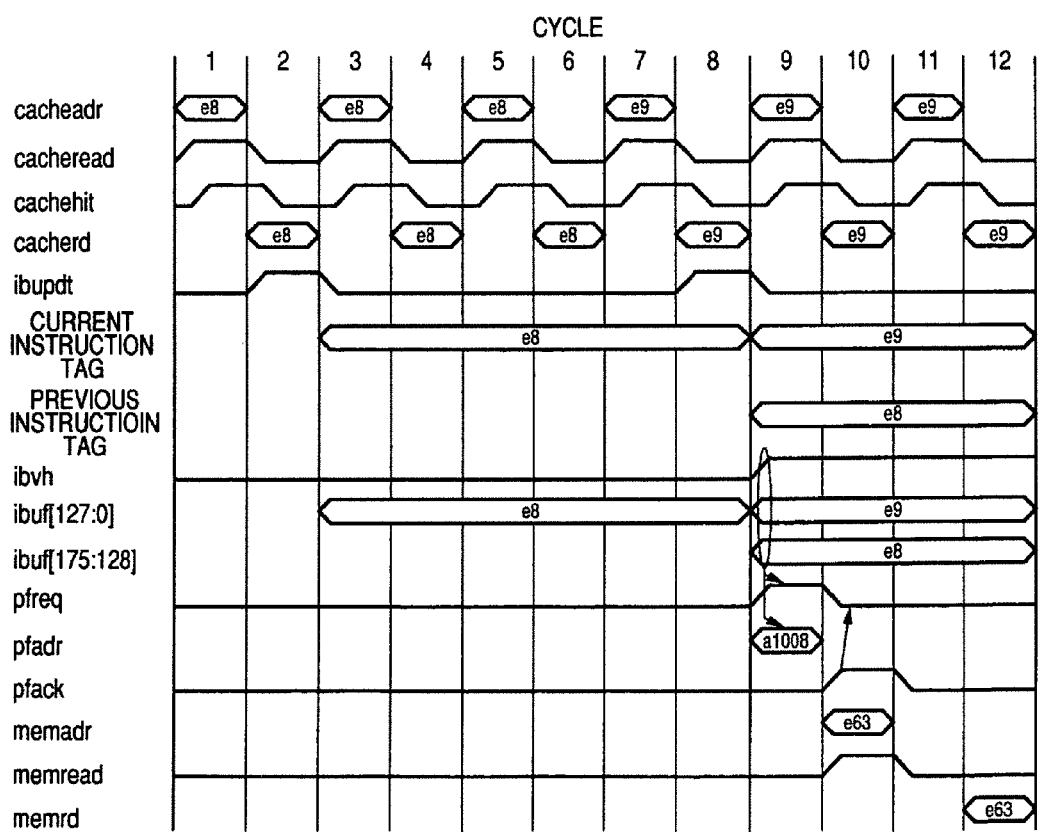
FIG. 18 is a timing chart of the actions of prefetch address calculation unit in the information processing apparatus of Embodiment 2 of the invention in a case in which there is a valid series of instructions for branch spanning two entries.

FIG. 18 is a timing chart of the actions of prefetch address calculation unit (1101) in a case in which there is a valid series of instructions for branch spanning two entries. FIG. 19 illustrates an example of program arrangement in a case in which there is a valid series of instructions for branch spanning entry 8 and entry 9. The timing chart of FIG. 18 refers to the operations of prefetch address calculation unit (1101) executing the program shown in FIG. 19.

In cycle 1, entry 8 is first hit and, following it, the control unit (1111) asserts ibufupdt in the next cycle 2 to store entry 8 into the instruction buffer (1103).

Next, in response to the assertion of ibufupdt, entry 8 is stored into the current instruction tag and the series of instructions of entry 8 is stored into the current instruction buffer in cycle 3.

As the program proceeds, entry 9 is first hit in cycle 7, and in the following cycle 8, the control unit (1111) asserts ibufupdt to store entry 9 into the instruction buffer (1103).

Then, in response to the assertion of ibufupdt, entry 9 is stored into the current instruction tag and the series of instructions of entry 9 is stored into the current instruction buffer in cycle 10. In the same cycle, entry 8 is stored into the previous instruction tag and the series of instructions of entry 8 is stored into the previous instruction buffer. As a result of storing of consecutive entries into the buffer 0 and the buffer 1, 11 consecutive instructions are outputted as ibuf [175:0], and ibvh is asserted. Then, prefetch address calculation unit (1101) detects a series of instructions for branch spanning entry 8 and entry 9 from ibuf [175:0], asserts pfreq, and outputs the prefetch address 1008 as fpadr [31:0]

As hitherto described, the prefetch address calculation unit (1101) can decode a valid series of instructions for branch spanning two entries and execute the prefetch request.

Figure 20:
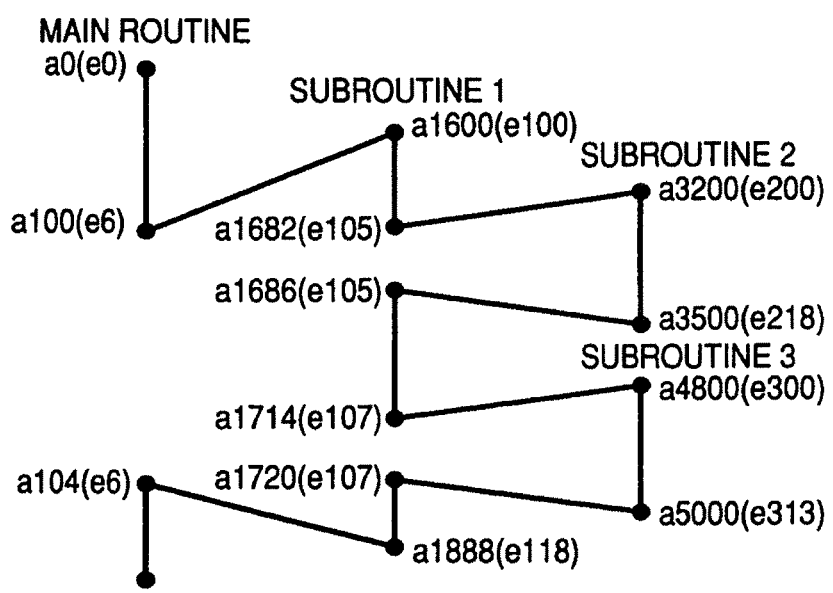
FIG. 20 illustrates an example of program flow in the information processing apparatus of Embodiment 2 of the invention.

FIG. 20 illustrates an example of program flow, and will be used later for explaining FIG. 21. The program shown in FIG. 20 is executed in the sequence of main routine subroutine 1→subroutine 2→subroutine 1→subroutine 3→subroutine 1→main routine.

The end points of straight lines shown in FIG. 20 respectively represent the starting point of the main routine, a branch instruction to a subroutine, an instruction of return from the subroutine, a target instruction for return from the subroutine and the end of the main routine. In the vicinities of some of the end points, corresponding addresses (entries) for use in the explanation of FIG. 21 are stated.

Figure 21:
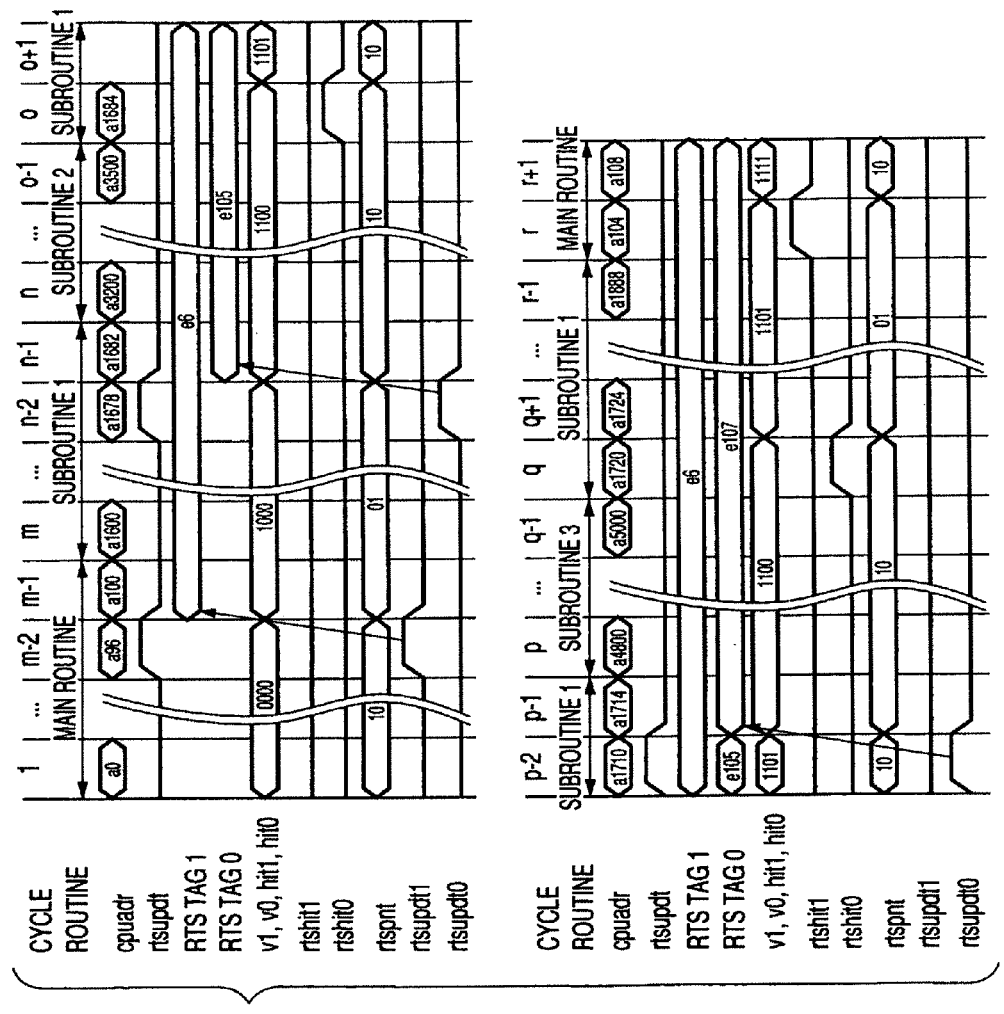
FIG. 21 is a timing chart of the actions to update the RTS instruction buffer in the program flow illustrated in FIG. 20 in the information processing apparatus of Embodiment 2 of the invention.

FIG. 21 is a timing chart of the actions to update the RTS instruction buffer in the program flow illustrated in FIG. 20.

First, the main routine stats in cycle 1. As the main routine proceeds, an instruction of branching into subroutine 1 is detected in cycle m-2, and the RTS buffer update signal rtsbupdt is asserted. Since the RTS update pointer here is "10", the series of instructions of entry 6 is stored into the RTS buffer 1 in cycle m-1. In the same cycle, 1 is set as the validity bit 1, and the value of the RTS pointer becomes "01".

Next, subroutine 1 starts in cycle m. As subroutine 1 proceeds, an instruction of branching into subroutine 2 is detected in cycle n−2, and the RTS buffer update signal rtsbupdt is asserted. Since the RTS update pointer here is "01", the series of instructions of entry 105 is stored into the RTS buffer 0 in cycle n−1. In the same cycle, 1 is set as the validity bit 0, and the value of the RTS pointer becomes "10".

Next, subroutine 2 is started in cycle n. As subroutine 2 proceeds, the RTS instruction is executed in cycle o-1.

Next, the program returns to subroutine 1 in cycle o, and the RTS buffer 0 is hit in the same cycle, and 1 is set as the hit bit 0, and the value of the RTS pointer becomes "01" in the following cycle o+1.

As subroutine 1 proceeds, a branch instruction into subroutine 3 is detected in cycle p-2, and the RTS buffer update signal rtsbupdt is asserted. As the RTS update pointer here is "01", the series of instructions of entry 107 is stored into the RTS buffer 0 in cycle p-1. In the same cycle, 1 is set as the validity bit 0, 0 is set as the hit bit 0, and the value of the RTS pointer becomes "10".

Next, subroutine 3 starts in cycle p. As subroutine 3 proceeds, the RTS instruction is executed in cycle q-1.

Then, the program returns to subroutine 1 in cycle q. In the same cycle, the RTS buffer 0 is hit. In the following cycle q+1, 1 is set as the hit bit 0, and the value of the RTS pointer becomes "01".

Next, the program returns to the main routine in cycle r. In the same cycle, the RTS buffer 1 is hit. In the following cycle r+1, 1 is set as the hit bit 1, and the value of the RTS pointer becomes "10".

The RTS updating algorithm described above can achieve such efficient updating matching the characteristic of the RTS buffer that every updated RTS buffer is hit, and no hit RTS buffer is reused.

As hitherto described, this embodiment can provide a high-performance information processing technique permitting at low cost updating of an instruction buffer ready for effective prefetch to branch instructions and returning to the subroutine with a small volume of hardware.

While the present invention has been described with reference to preferred embodiments thereof, the invention is not limited to these embodiments, but the design can obviously be modified in various ways without dethroughting from the true spirit and scope of the invention.

The information processing apparatus according to the invention, provided with a CPU, a memory and prefetch means, can be effectively applied to a technique for prefetch to an interruption routine and a target instruction for return from interrupt. It can also be effectively applied to prefetching to the target information for branch of a subroutine and the storing the target information of RTS, with particular effectiveness to high-performance information processing apparatuses.

What is claimed is:

1. An information processing apparatus comprising:
a memory that stores a plurality of instructions each having m bits;
a first bus connected to the memory and having a bus width of 128 bits as m bits×n, where n is an integer;
a cache connected to the first bus to store instructions selected from the plurality of instructions in the memory;
a second bus connected to the cache and having a bus width of 128 bits as m bits×n;
a selector connected to the first bus and the second bus;
a third bus connected to the selector and having a bus width of 32 bits comprising m bits×L, where L is defined by L<n;
a CPU being connected to the third bus;
an instruction buffer connected to the second bus; and
an address calculation unit connected to the instruction buffer;
wherein the address calculation unit is configured to check whether a branch instruction and an instruction for calculation of branch target address exists in the instructions stored in the instruction buffer, and to decode the branch instruction and the instruction for calculation of a branch target address upon existence of them before the CPU executes the branch instruction and the instruction for calculation of branch target, so the address calculation unit is further configured to calculate the branch target address and generate a prefetch request to prefetch an instruction of the branch target address from the memory and store the prefetched instruction into the cache.

2. The information processing apparatus according to claim 1, wherein L=2.

3. The information processing apparatus according to claim 1, wherein an access latency of the memory is 2 cycles.

4. The information processing apparatus according to claim 1, upon simultaneous occurrence of the prefetch request from the prefetch address calculation unit and a read request from the CPU, priority is given to the read request from the CPU.

* * * * *